United States Patent
Takeshita et al.

(10) Patent No.: US 7,660,217 B2
(45) Date of Patent: Feb. 9, 2010

(54) OPTICAL DISC RECORDING METHOD AND OPTICAL DISC

(75) Inventors: Nobuo Takeshita, Tokyo (JP); Osamu Tsukahara, Tokyo (JP); Tomo Kishigami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 276 days.

(21) Appl. No.: 10/587,913

(22) PCT Filed: Aug. 24, 2004

(86) PCT No.: PCT/JP2004/012089

§ 371 (c)(1),
(2), (4) Date: Jul. 31, 2006

(87) PCT Pub. No.: WO2005/101381

PCT Pub. Date: Oct. 27, 2005

(65) Prior Publication Data

US 2007/0159942 A1    Jul. 12, 2007

(30) Foreign Application Priority Data

Mar. 30, 2004    (JP) .............................. 2004-099616

(51) Int. Cl.
*G11B 7/00* (2006.01)
(52) U.S. Cl. .................................. 369/47.53
(58) Field of Classification Search .................. None
See application file for complete search history.

(56) References Cited

U.S. PATENT DOCUMENTS

| | | | |
|---|---|---|---|
| 6,717,895 B2 | 4/2004 | Zhou et al. | |
| 7,274,638 B2 * | 9/2007 | Lee et al. | 369/47.53 |
| 7,286,455 B2 * | 10/2007 | Shoji et al. | 369/47.53 |
| 7,376,058 B2 * | 5/2008 | Narumi et al. | 369/47.53 |
| 2003/0137909 A1 | 7/2003 | Ito et al. | |
| 2003/0137915 A1 * | 7/2003 | Shoji et al. | 369/59.25 |
| 2003/0185121 A1 * | 10/2003 | Narumi et al. | 369/47.53 |
| 2004/0120234 A1 | 6/2004 | Sano | |
| 2005/0025013 A1 * | 2/2005 | Yamamoto | 369/47.53 |

(Continued)

FOREIGN PATENT DOCUMENTS

EP    1 195 749 A2    4/2002

(Continued)

OTHER PUBLICATIONS

European Office Action, EP Application No. 04 772 050.3, Apr. 2, 2009, 5 pages.

*Primary Examiner*—Peter Vincent Agustin
(74) *Attorney, Agent, or Firm*—Birch, Stewart, Kolasch & Birch, LLP

(57) ABSTRACT

A recording method for an optical disc having at least three recording layers (11, 12, 13, 14), in which test recording areas are formed in the odd-numbered recording layers (11, 13) and the even-numbered recording layers (12, 14) in positions that are mutually non-overlapping in the thickness direction of the optical disc, the test recording areas in the odd-numbered recording layers are formed in positions mutually aligned in the thickness direction, and the test recording areas in the even-numbered recording layers are formed in positions mutually aligned in the thickness direction. The time for test recording for determining the optimal recording power can be shortened.

6 Claims, 16 Drawing Sheets

U.S. PATENT DOCUMENTS

2005/0078578 A1    4/2005    Sasaki

FOREIGN PATENT DOCUMENTS

| | | |
|---|---|---|
| EP | 1 318 509 A1 | 6/2003 |
| JP | 5-225571 A | 9/1993 |
| JP | 10-134375 | 5/1998 |
| JP | 11-3550 A | 1/1999 |
| JP | 2000-195054 | 7/2000 |
| JP | 2000-311346 A | 11/2000 |
| JP | 2003-168216 A | 6/2003 |
| JP | 2003-202321 A | 7/2003 |
| JP | 2003-257032 | 9/2003 |
| JP | 2003-288759 A | 10/2003 |
| JP | 2003-346379 | 12/2003 |
| JP | 2004-63035 A | 2/2004 |
| JP | 2005063628 A | 3/2005 |
| JP | 2006-527457 A | 11/2006 |
| KR | 2001-0098421 A | 11/2001 |
| WO | WO-02/23542 A1 | 3/2002 |
| WO | WO-2004/112007 A1 | 12/2004 |
| WO | WO-2005/001824 A1 | 1/2005 |

* cited by examiner

OPTICAL DISC RECORDING METHOD AND OPTICAL DISC

FIELD OF THE INVENTION

The present invention relates to an optical disc and to a recording method for an optical disc. More particularly, the invention relates to a recording method for an optical disc with a plurality of recording layers, and to the recording of test data for determining the optimal recording power in each recording layer. The invention also relates to an optical disc for use in recording by the above method, and to an optical disc on which recording has been performed by the above method.

BACKGROUND ART

In conventional recording methods for optical discs having a plurality of recording layers, when test recording is performed in the recording layers, test recording areas are formed in adjacent recording layers in locations that overlap in the thickness direction. Moreover, the optimal recording power is determined for each recording layer without consideration of the effects of adjacent recording layers. Consequently, what is determined to be the optimal recording power sometimes differs slightly from the true value because of the effects of adjacent layers.

A proposed solution to this problem is to check the usage status of the test areas in recording layers other than the layer in which information (user data) will be recorded, particularly in upper recording layers (disposed on the side toward the optical pickup), before performing the test recording in the layer in which the information will be recorded (see, for example, Patent Document 1). Patent Document 1: Japanese Patent Application Publication No. 2000-311346 (FIGS. 1 to 8)

DISCLOSURE OF THE INVENTION

Problems to be Solved by the Invention

A problem with the method described in Patent Document 1 is that when test recording is performed in one recording layer, since the usage status of test recording areas in other layers is checked, considerable time must pass before recording can start.

An object of the present invention is to shorten the time preceding the start of recording.

Means of Solution of the Problems

The invention provides a recording method for an optical disc having at least three recording layers, the method including a step of recording and reproducing test data for determining the optimal recording power when user data are recorded in each recording layer, and determining the optimal recording power by evaluating the reproduction results, wherein when test recording areas are formed by recording the test data, the test recording areas in the odd-numbered recording layers and the test recording areas in which the test data are recorded in the even-numbered recording layers do not overlap in the thickness direction of the optical disc, the test recording areas in the odd-numbered recording layers are mutually aligned in the thickness direction, and the test recording layers in the even-numbered recording layers are mutually aligned in the thickness direction.

EFFECT OF THE INVENTION

Since test recording areas in mutually adjacent layers do not overlap in this recording method, it is unnecessary to check the usage status of adjacent recording layers when a test recording is made. The time preceding the start of recording can accordingly be shortened. Another effect is that, as the test recording areas are disposed in only two arrangements, one in the odd-numbered recording layers and another in the even-numbered recording layers, when part of an optical disc is reserved for reproducing use only, the manufacturing process of the optical disc can be simplified. Moreover, when the recording and reproducing device that performs the test recording has a control means that operates according to a computer program, the program can be simplified because only two types of processing are required, one for odd-numbered layers and one for even-numbered layers.

Figure 1:
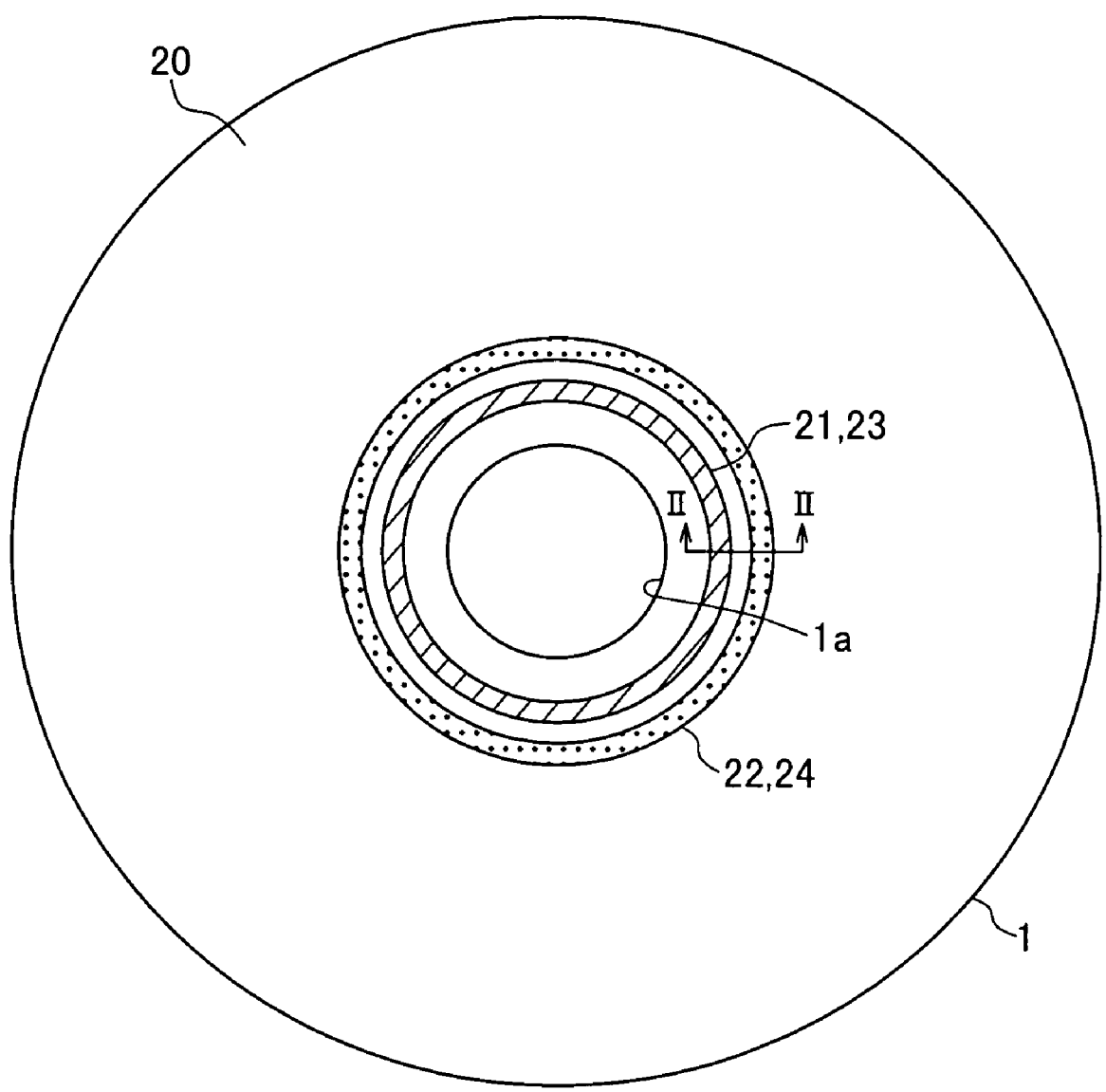
FIG. 1 is a schematic plan view of an exemplary optical disc on which recording has been performed by a recording method according to a first embodiment of the invention.

EXPLANATION OF REFERENCE CHARACTERS 1, 2 optical disc, 11-14 recording layers, 20 user data area, 21-24 test recording areas, 30 management area, 31-34 non-recording areas, 41-44 reproduce-only areas, 52 optical pickup, 55 laser driving circuit, 56 servo control circuit, 58 central control circuit, 66 test pattern generating circuit, 67 reproducing circuit, 68 jitter detecting circuit.

BEST MODE OF PRACTICING THE INVENTION

Embodiments of the present invention will be described below with reference to the drawings.

First Embodiment

Figure 2:
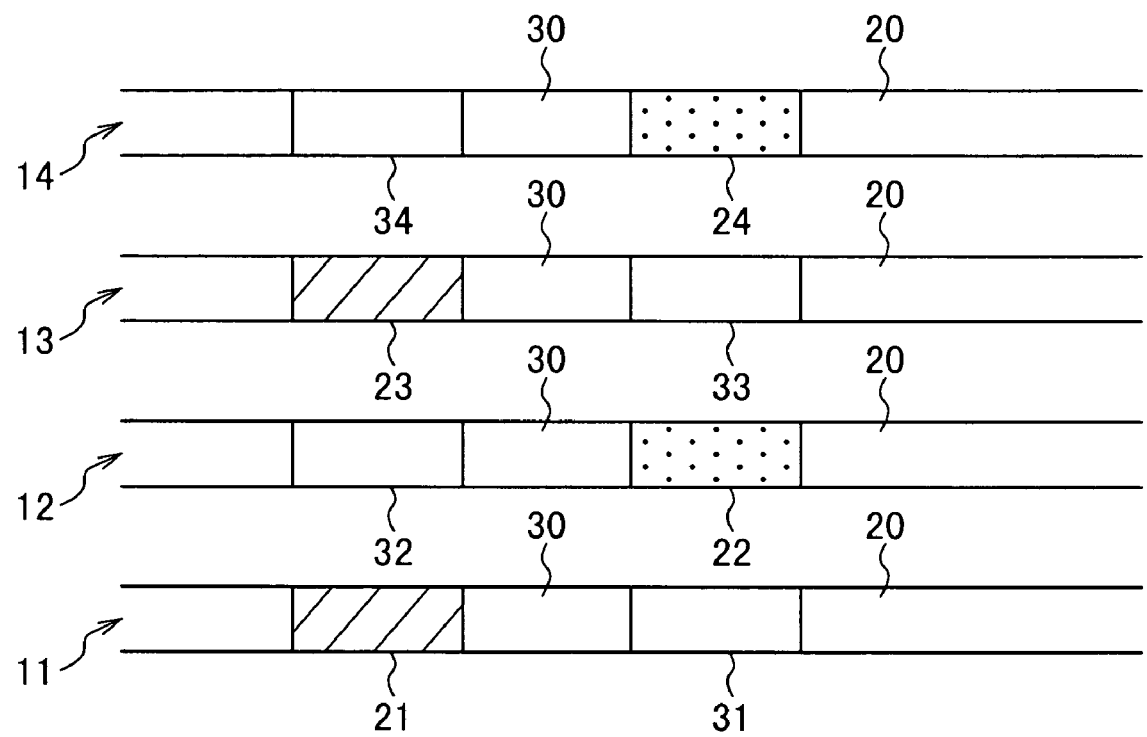
FIG. 2 is a schematic sectional view through line II-II in FIG. 1.

FIG. 1 is a schematic plan view of an exemplary optical disc on which test data have been recorded by a recording method according to a first embodiment of this invention; FIG. 2 is a schematic sectional view through line II-II in FIG. 1, showing the positional relationships of the test recording areas in each layer.

In the optical disc 1 shown in FIGS. 1 and 2, four recording layers, are formed: a first recording layer 11, a second recording layer 12, a third recording layer 13, and a fourth recording layer 14, in order of their distance from the surface (the side facing the optical pickup). In each of the first, second, third, fourth recording layers 11, 12, 13, 14, test data are recorded to determine the optimal recording power for each recording layer, forming test recording areas 21, 22, 23, 24.

In the odd-numbered recording layers (which may be simply referred to as odd-numbered layers below) as counted from the surface (the lower side in FIG. 2, near the optical pickup described below), these being the first and third recording layers 11 and 13, the test recording areas 21, 23 are formed in positions mutually aligned in the thickness direction, both the starting points and the endpoints being aligned in the thickness direction; in the even-numbered recording layers (which may be simply referred to as even-numbered layers below), these being the second and fourth recording layers 12 and 14, the test recording areas 22, 24 are likewise formed in positions mutually aligned in the thickness direction, both the starting points and the endpoints being aligned in the thickness direction.

The test recording areas 21, 23 in the odd-numbered layers and the test recording areas 22, 24 in the even-numbered layers are disposed in mutually non-overlapping positions.

Moreover, as shown in FIG. 1, the test recording areas in the odd-numbered and the test recording areas in the even-numbered layers are both formed near the inner edge of the optical disc, that is, near the innermost circumference 1a.

The areas (facing areas) facing the test recording areas 21, 22, 23, 24, specifically, the areas 31, 32, 33, 34 aligned in the thickness direction and located in the adjacent recording layers, are areas in which test data are not recorded by an optical recording device (non-recording areas). In other words, the test recording areas 21 to 24 are formed in positions facing the non-recording areas 31 to 34. The non-recording areas may be, for example, reproduce-only areas. A reproduce-only area includes pits that record, for example, recording conditions for the optical disc such as its recommended write strategy parameters, a recommended asymmetry value, and a recommended wavelength value; the data recorded in the reproduce-only area are usually read before a test recording is made, to determine the conditions of the test recording.

When the facing areas are reproduce-only areas, the reproduce-only areas are formed when the optical disc is manufactured in positions that take the arrangement of test recording areas 21 to 24 (the positions in which test recording areas 21 to 24 will be formed) into consideration so that the reproduce-only areas will face the test recording areas 21 to 24 as described above.

The area 30 between the test recording areas 21 to 24 and the non-recording areas 31 to 34 is used for recording disc management data, for example.

The greater part of the optical disc, excluding the non-recording areas 31 to 34, the area 30 for recording management data, and the test recording areas 21 to 24, is a recordable user data area 20.

Figure 3:
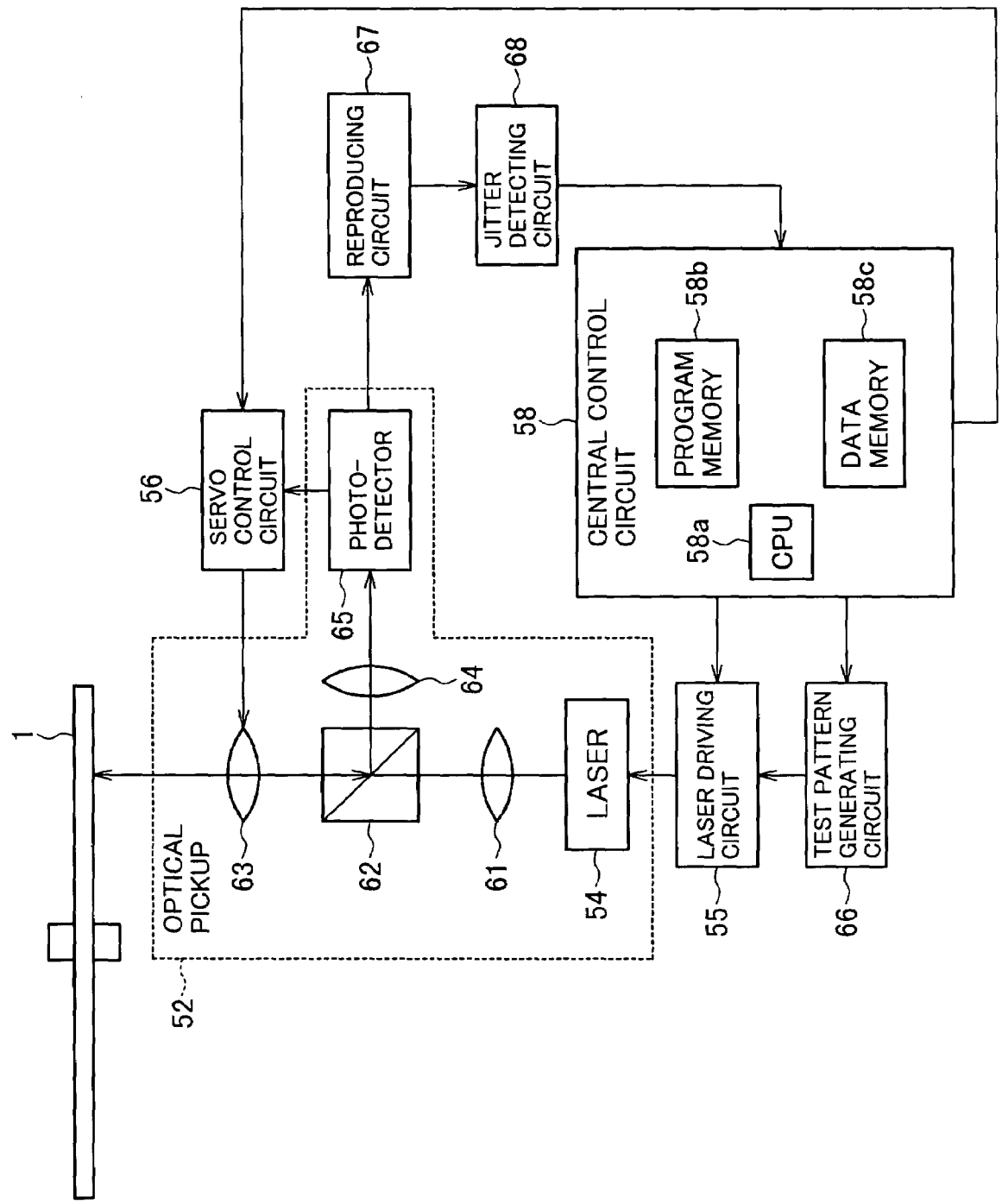
FIG. 3 is a schematic block diagram showing an exemplary optical recording device used in practicing the recording method of the first embodiment of the invention.

FIG. 3 is a schematic diagram showing an optical recording device used in recording on the optical disc.

As shown in FIG. 3, this optical recording device includes an optical pickup 52 that focuses a laser beam on a selected recording-layer (one of the recording layers 11 to 14) of the optical disc 1 and receives the reflected light, a laser driving circuit 55 that supplies laser driving signals to a laser 54 in the optical pickup 52, a servo control circuit 56 that supplies objective lens driving signals to the optical pickup 52, and a central control circuit 58 that controls the laser driving circuit 55 and servo control circuit 56.

The optical pickup 52 has a laser (a semiconductor laser, for example) 54 that emits a laser beam for recording and reproducing information on the optical disc 1, a collimating lens 61, a beam splitter 62 that passes the laser beam from the laser 54, directs the laser beam onto the optical disc 1, and deflects the light reflected from the optical disc 1 in a predetermined direction, an objective lens 63, a detection lens 64, and a photodetector 65 that converts the reflected light to an electrical signal.

The servo control circuit 56 drives the objective lens 63 of the optical pickup 52 to perform tracking control and focusing control according to output from the photodetector 65.

The laser driving circuit 55 controls the power of the laser beam emitted from the laser 54 by adjusting the level of current supplied to the laser 54.

The optical recording device also includes a test pattern generating circuit 66, a reproducing circuit 67 that reproduces signals including information detected by the photodetector 65, and a jitter detecting circuit 68 that detects jitter in the reproduced signals output from the reproducing circuit 67.

In writing and reading, a desired recording layer is selected by a focusing control operation using the servo control circuit 56. More specifically, the beam is focused on the desired recording layer.

When test data are recorded, a test pattern is output to the laser driving circuit 55 from the test pattern generating circuit 66. The laser driving circuit 55 receives a recording power command from the central control circuit 58, and supplies test pattern current to the laser 54 at a level corresponding to the commanded optical power.

A laser beam corresponding to the test pattern current is emitted from the laser 54, passes through the collimating lens 61, beam splitter 62, and objective lens 63, and is focused so as to illuminate the selected recording layer (one of the recording layers 11, 12, 13, 14) of the optical disc 1, and test data corresponding to the test pattern are recorded in the recording layer.

When the recorded test data are reproduced, the laser driving circuit 55 is given a reproducing power command by the central control circuit 58, and supplies current at a level corresponding to the reproducing power to the laser 54. The laser beam emitted from the laser 54 passes through the collimating lens 61, beam splitter 62, and objective lens 63, and is focused to illuminate the selected recording layer (one of the recording layers 11, 12, 13, 14) of the optical disc 1.

The light reflected from the selected recording layer passes through the objective lens 63, is reflected in the beam splitter 62, passes through the detecting lens 64, is received by the photodetector 65, and is converted to an electrical signal. The detected signal from the photodetector 65 is output to the servo control circuit 56 and the reproducing circuit 67.

The servo control circuit 56 performs tracking control and focusing control according to the detected signal.

The reproducing circuit 67 decodes and corrects errors in the detected signal, and outputs a reproduced signal. The reproduced signal from the reproducing circuit 67 is supplied to the jitter detecting circuit 68, which detects jitter in the reproduced signal.

The central control circuit 58 includes, for example, a central processing unit (CPU) 58a, a program memory 58b that stores programs executed by the CPU, and a data memory 58c that stores data. The programs stored in the program memory 58b include programs for controlling the operations described below.

The above optical recording device can record not only user data but also test data. A test recording is made by using the optical recording device as described below.

A test recording is made before user data are recorded in each recording layer; part of each recording layer is designated as a test recording area. Test recording areas are designated in the alignments shown in FIGS. 1 and 2.

Figure 4:
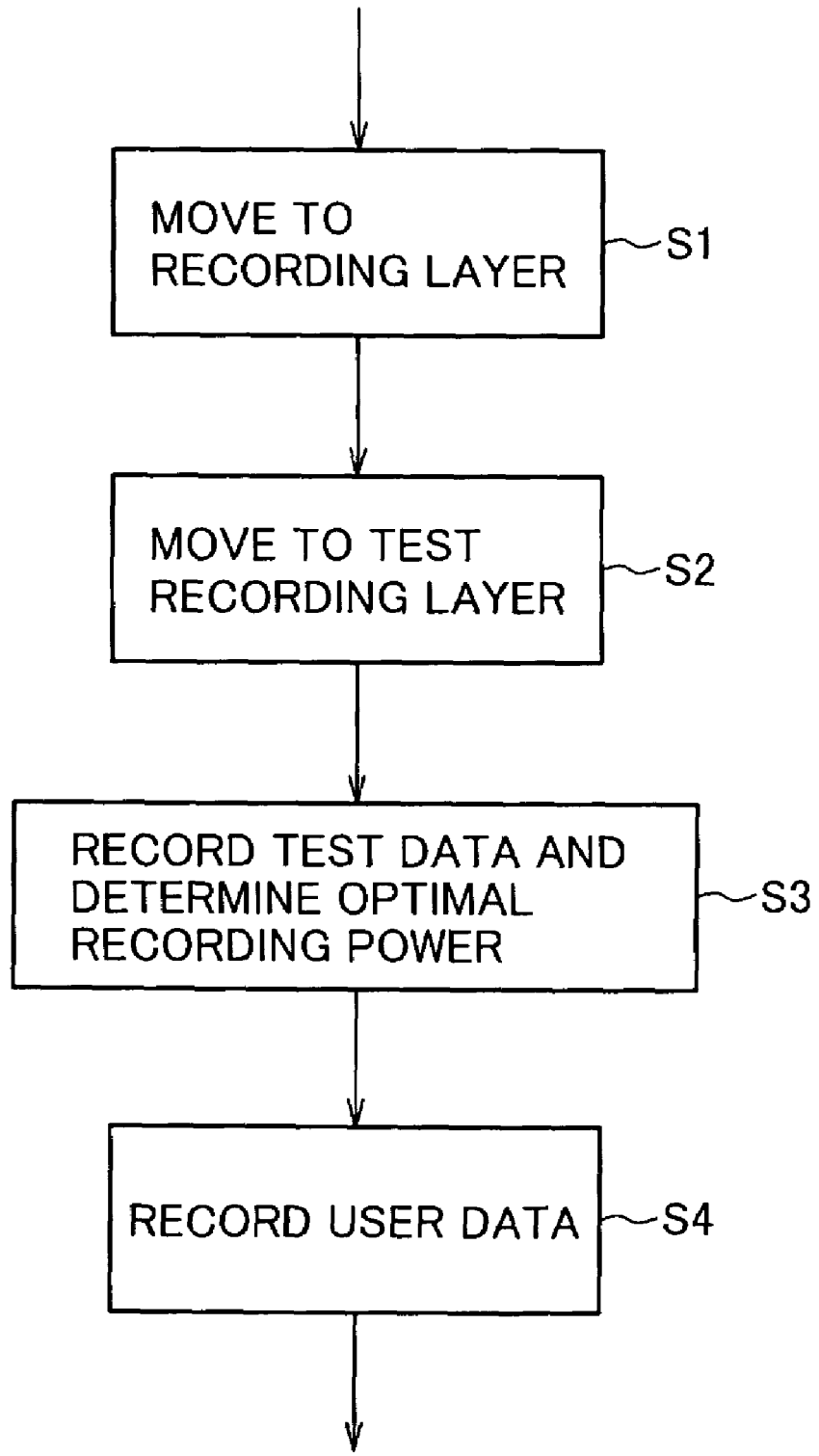
FIG. 4 is a flowchart showing a recording procedure in the first embodiment of the invention.

Referring to FIG. 4, the procedure for recording will be described below.

The description will initially assume that a recording is to be made in the first recording layer 11.

First, in step S1 the focal point (the spot of light) is moved to the recording layer in which the recording will be made: for example, the first recording layer 11. The central control circuit 58 gives the servo control circuit 56 information designating the target recording layer for focusing control (the tracking target); the servo control circuit 56 moves the objective lens 63 in a direction perpendicular to the recording surface of the optical disc according to this information.

Next, in step S2 the focal point is moved to the test recording area in the recording layer: for example, test recording area 21. The central control circuit 58 gives the servo control circuit 56 information (a track address) designating a target track for a seeking and tracking operation; the servo control circuit 56 moves the objective lens 63 in a direction parallel to the recording surface of the optical disc according to this information, and then detects a designated sector by to its sector address.

Next, in step S3 test data are recorded in the test recording area 21, and the optimal recording power is determined by reproducing the signal including the test data. Information indicating the optimal recording power is stored in the data memory 58c in the central control circuit 58.

In this specification, the procedure from step S1 to step S3 may be simply referred to as test recording.

User data are then recorded in the user data area 20 in the recording layer, using the optimal recording power stored in the data memory 58c in step S4.

The procedure from step S1 to step S4 is also used in the other recording layers, specifically, the second to fourth recording layers 12 to 14: user data are recorded (step S4) after a test recording (steps S1 to S3). Before step S4 (the recording of user data) ends in one recording layer, steps S1 to S3 (test recording) may be carried out in another recording layer.

For example, if recordings are made in the first, second, third, and fourth recording layers in this order, a test recording may be made in the second recording layer 12 before the recording of user data in the first recording layer 11 ends, e.g., between the recording of different pieces of user data in the first recording layer 11. Similarly, a test recording may be made in the third recording layer 13 before the recording of user data in the second recording layer 12 ends, e.g., between the recording of different pieces of user data in the first and second recording layers 11 and 12. Similarly, a test recording may be made in the fourth recording layer 14 before the recording of user data in the third recording layer 13 ends, e.g., between the recording of different pieces of user data.

Because the recording conditions that affect the optimal recording power change from time to time, however, the interval from when a test recording is made in a recording layer to when the recording of user data starts in that recording layer is preferably short. Most preferably, a test recording is made in a given recording layer just before the start of the recording of user data in that recording layer.

In the first to fourth recording layers, the test recording areas in which test data are recorded are disposed as described above with reference to FIGS. 1 and 2. When, for example, the central control circuit 58 designates an area in which test data are to be recorded by a track address and a sector address, the track address and the sector address are determined so as to give the alignment shown in FIGS. 1 and 2.

Figure 5:
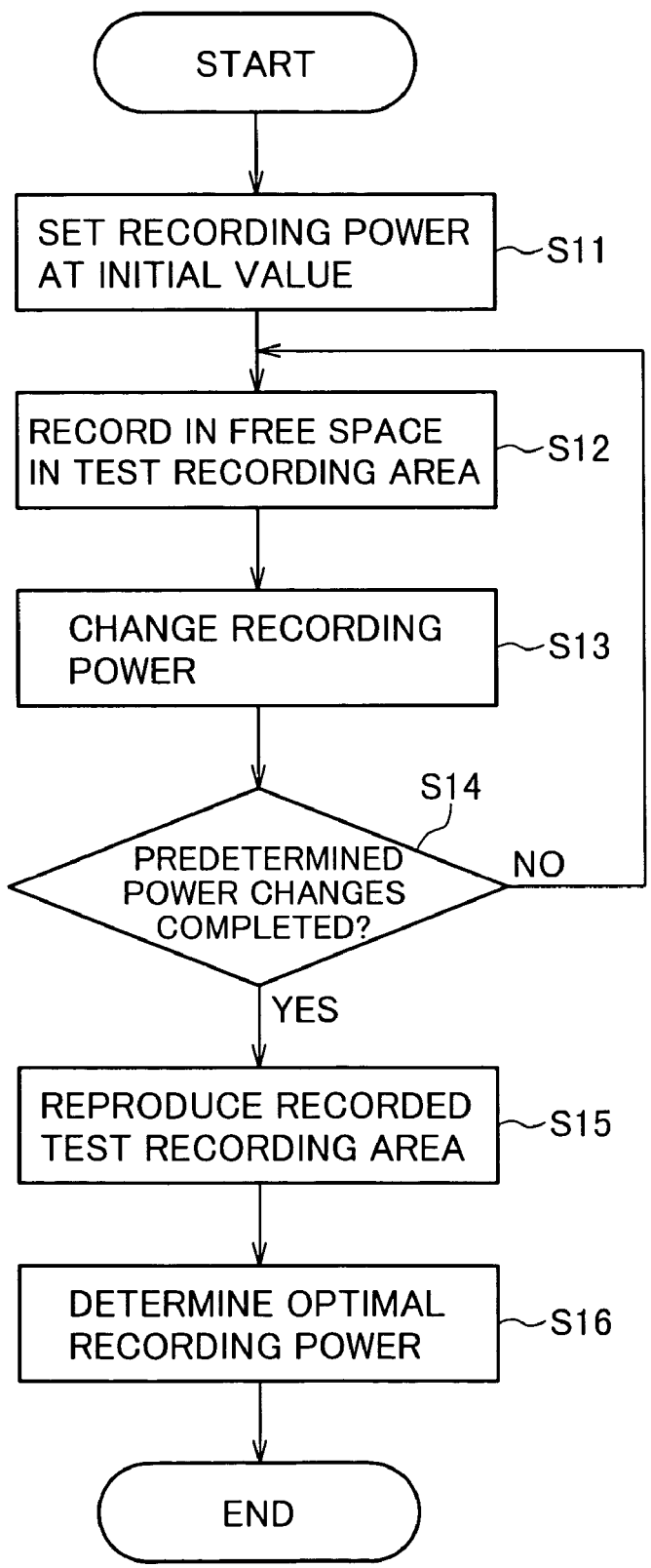
FIG. 5 is a flowchart showing a test recording procedure in the first embodiment of the invention.

FIG. 5 shows the details of the processing in step S3 in FIG. 4, specifically, the process of recording and reproducing test data in the test recording areas, and the determination of the optimal recording power.

As shown in FIG. 5, first, test data are recorded in the test recording area in steps S11 to S14. Next, the recorded signal is reproduced in step S15. The optimal recording power is then determined according to the reproduced signal in step S16.

Figure 6:
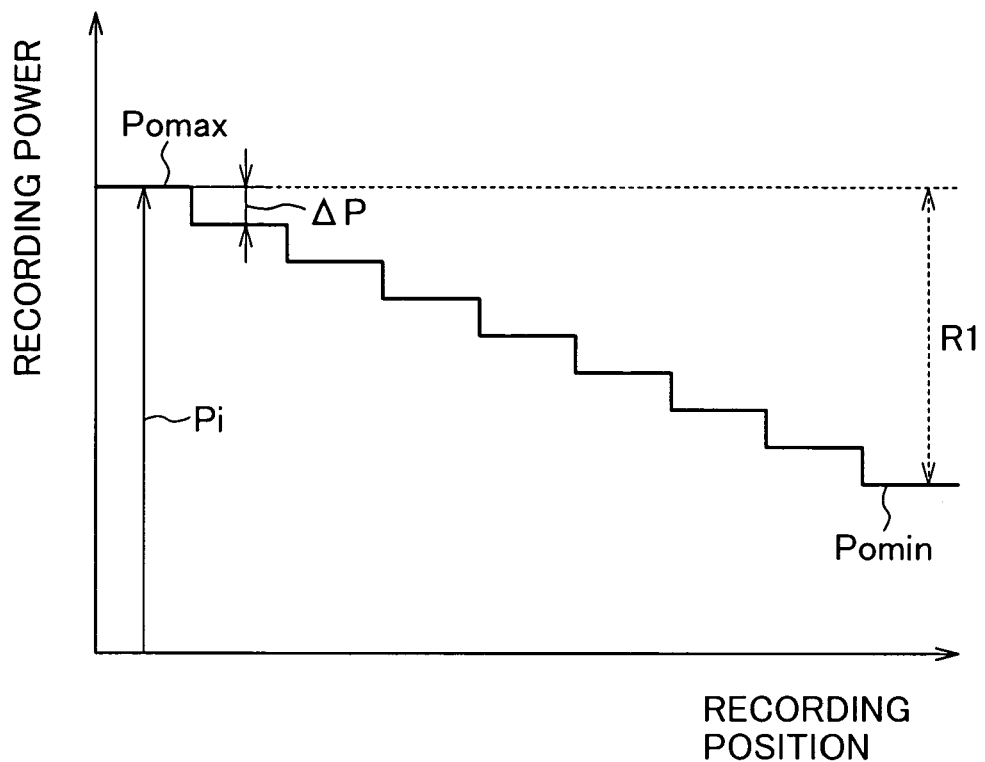
FIG. 6 shows an example of a relationship between recording position and recording power in a test recording area.

When the test data are recorded in a test recording area, the recording power level is changed during the recording. In the example shown in FIG. 6, the recording power is decreased in steps. Therefore, the recording power is first set at an initial value (Pi) in step S11, a portion having a predetermined length is specified in the as yet unrecorded part (free space) of the test recording area (the area in which the test data are to be recorded), and test data are recorded in the specified portion in step S12; then the recording power level is changed, e.g., decreased, by a predetermined step width $\Delta P$ (the resolution of the power determination) in step S13. If it is then decided in step S14 that the number of times the recording power level has been changed has not reached a predetermined number, the processing returns to step S12, a portion having the predetermined length is specified in the free space in the test recording area again, and test data are recorded in the specified portion in step S12 at the new power level. When the number of times the recording power level has been changed reaches the predetermined number in step S14, the processing proceeds to step S15. The portion having the predetermined length is specified in the free space in step S12 by specifying a sector address in the free space.

In step S14, whether the recording power level has reached (or been reduced to) a predetermined value may be determined, instead of deciding whether the number of times the recording power level has been changed has reached a predetermined number.

In the above-described stepping of the recording power level, the initial value is the upper limit (maximum value) Pomax in a range (R1) considered to be the maximum range of variation of the optimal recording power level due to all possible variations in the optical disk manufacturing process and recording conditions (such as temperature), and the final value is the lower limit (minimum value) Pomin of this range (R1).

Figure 7:
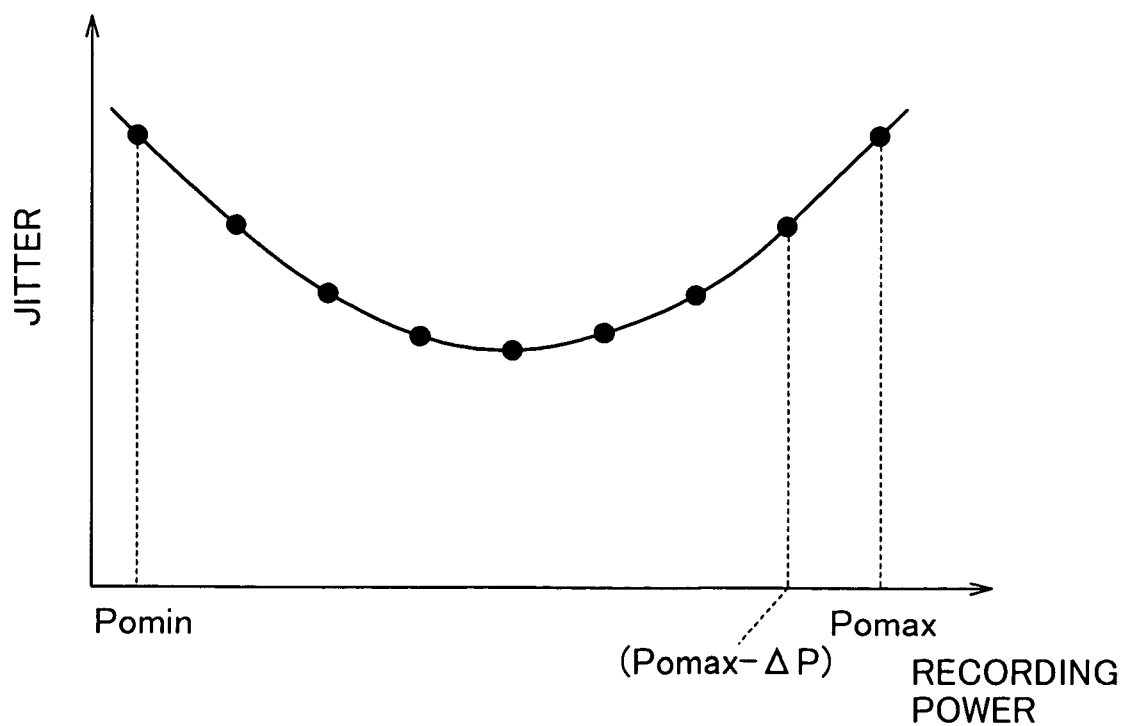
FIG. 7 shows a relationship between test recording position and jitter.

In step S15, the recorded test data are reproduced, the relationship between the value of the recording power and the quality (jitter, for example) of the reproduced signal is found as shown in FIG. 7, and the recording power generating the reproduced signal of the best quality (minimum jitter) is taken as the optimal recording power in step S16.

The optimal recording power may be obtained from the relationship between the recording power level and the amplitude of the reproduced signal, instead of the relationship between the recording power level and jitter. This is because disc space in the test recording areas is limited in actual optical disc devices, and because it takes time to find the relationship between the recording power level and jitter. The optimal recording power may also be obtained from the relationship between the recording power level and an asymmetry value. The optical recording device then includes a reproduced signal amplitude detecting circuit or an asymmetry value detecting circuit instead of the jitter detecting circuit 68 in FIG. 3.

In the first embodiment, as described above, test recording areas are disposed in adjacent recording layers in mutually non-overlapping positions in the thickness direction of the optical disc. The reason is as follows. Because recordings are made in a test recording area by changing the recording power level from a value smaller than the estimated optimal value to a value greater than the estimated optimal value, the recordings are partly made at a comparatively high recording power level. Because the recording power level is determined individually for each optical disc device, and would be difficult to restrict, there is a strong probability that recording in a test recording area will affect the facing area, specifically, the area located in the adjacent recording layer and aligned in the thickness direction. In order to prevent such effects, the test recording areas in adjacent recording layers are disposed in mutually non-overlapping positions in the thickness direction.

Figure 8:
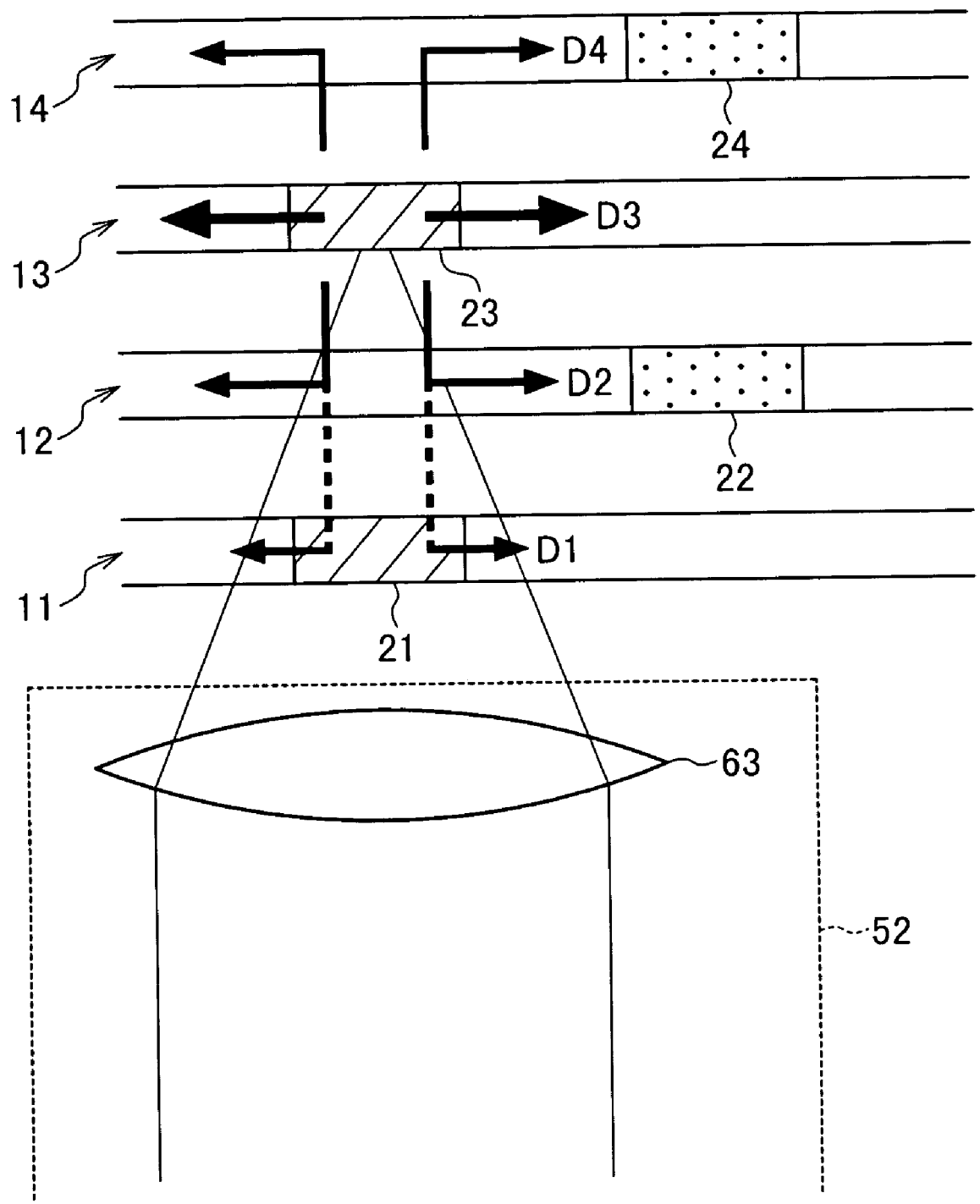
FIG. 8 illustrates heat transfer from a focused spot to each recording layer.

For example, when the recording power illuminates, e.g., the third recording layer 13 in FIG. 8, some of the recording power is also delivered to the second recording layer 12, which is one layer nearer the optical pickup 52. The magnitude of the effect produced differs depending on the spacing between the recording layers; a greater spacing enlarges the diameter of the spot of light, lowers the energy density, and reduces the effect. In the adjacent recording layer (the second recording layer 12), however, the energy density is high enough that the effect cannot be ignored.

The test recording areas in two recording layers such as the first and third recording layers 11 and 13 that are separated by an intervening recording layer are mutually aligned in the thickness direction for the following reason.

First, when a recording is made in one of two recording layers separated by an intervening recording layer, the effect described above on the other recording layer is comparatively small. For example, in FIG. 8, the effect on the first recording layer 11, which is separated by the adjacent second recording layer 12 from the third recording layer 13 on which the light is focused, is significantly less than the effect on the second recording layer 12, and can be ignored. This is because the magnitude of the effect decreases in proportion to the second power of the distance between the recording layers.

The same conclusion is reached by considering heat transfer paths. Since the recording layers include materials of comparatively high thermal conductivity such as metal film and dye, heat is transferred along each recording layer as indicated by arrows D1 to D4 in FIG. 8. Most of the heat is dissipated along the heat transfer path D3 in the third recording layer 13, on which the light is focused, and along the heat transfer paths D2 and D4 in the adjacent second and fourth recording layers 12 and 14, leaving only a very small amount of heat to be transferred to the first recording layer 11.

In a recordable optical disc having at least three layers, placing the test recording areas in all the recording layers in mutually non-overlapping positions could also be considered, but that would give rise to the following problem. For example, if the test recording area 23 in the third recording layer 13 were to be placed in an area facing neither the test recording area 21 in the first recording layer 11 nor the test recording area 22 in the second recording layer 12, the total area facing the test recording areas would be increased, and since this facing area is unsuited for the recording of normal user data, the usage efficiency of the recording areas would be reduced.

If, for example, the test recording areas were to be disposed in positions facing a reproduce-only area, the structure of the recording layers of the optical disc (the location of the reproduce-only area) would vary from one recording layer to another, making the optical disc manufacturing process more complicated. Moreover, the addressing programs used in the recording and reproducing device for test recording and for the recording of user data would become more complex.

On the other hand, in the first embodiment, for example, the test recording area 23 in the third recording layer 13 and the test recording area 21 in the first recording layer 11 are disposed in positions aligned in the thickness direction, both facing the same area in the other layers. Thus no additional area in the other layers faces a test recording area, and the identical alignment of areas in the third recording layer 13 and the first recording layer 11, simplifies the optical disc manufacturing process and the programming of the recording and reproducing device.

Similarly, the test recording area 24 in the fourth recording layer 14 and the test recording area 22 in the second recording layer 12 are disposed in positions aligned in the thickness direction, so that there is no new additional area facing the test recording area 24 in the fourth recording layer 14. The identical alignment of the fourth recording layer 14 and the second recording layer 12 also simplifies the optical disc manufacturing process and the program in the recording and reproducing device.

Although an optical disc having four layers has been described in the first embodiment, in an optical disc having only three layers or having five or more layers, the test recording areas in the odd-numbered recording layers may be similarly formed in positions mutually aligned in the thickness direction, and the test recording areas in the even-numbered recording layers may be formed in positions mutually aligned in the thickness direction.

Moreover, as described above, because the test recording areas 21 to 24 are formed in positions facing non-recording areas 31 to 34, the following effects are obtained. More specifically, if the test recording areas in mutually adjacent layers were to overlap, a test recording made in one layer might affect the facing test area, so that when a test recording was made in the facing test area later, it might not be possible to carry out an accurate test. This problem is solved by placing a non-recording area such as a reproduce-only area, which is not affected by the recording power, in a position facing each test recording area.

Figure 9:
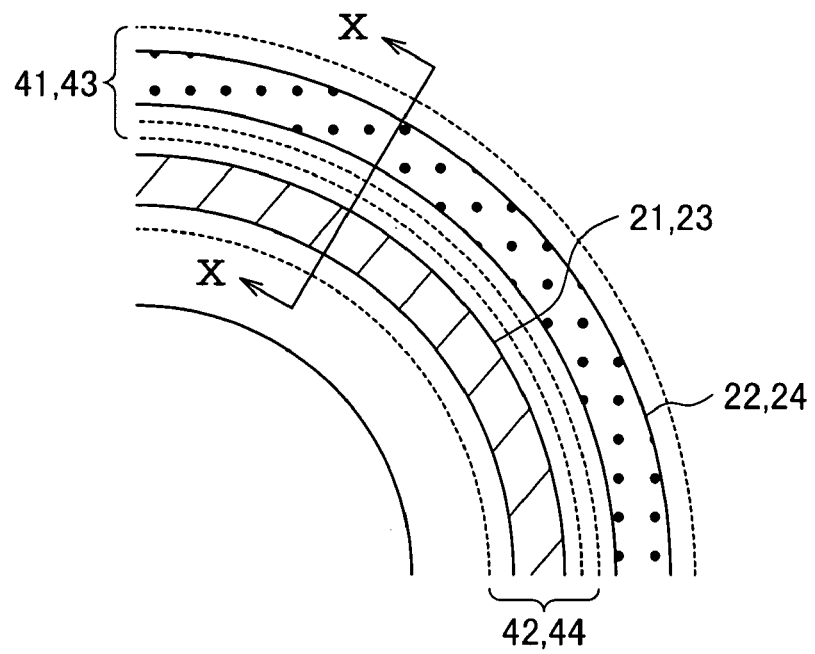
FIG. 9 is a schematic plan view of another exemplary optical disc on which recording has been performed by a recording method according to the first embodiment of the invention.
Figure 10:
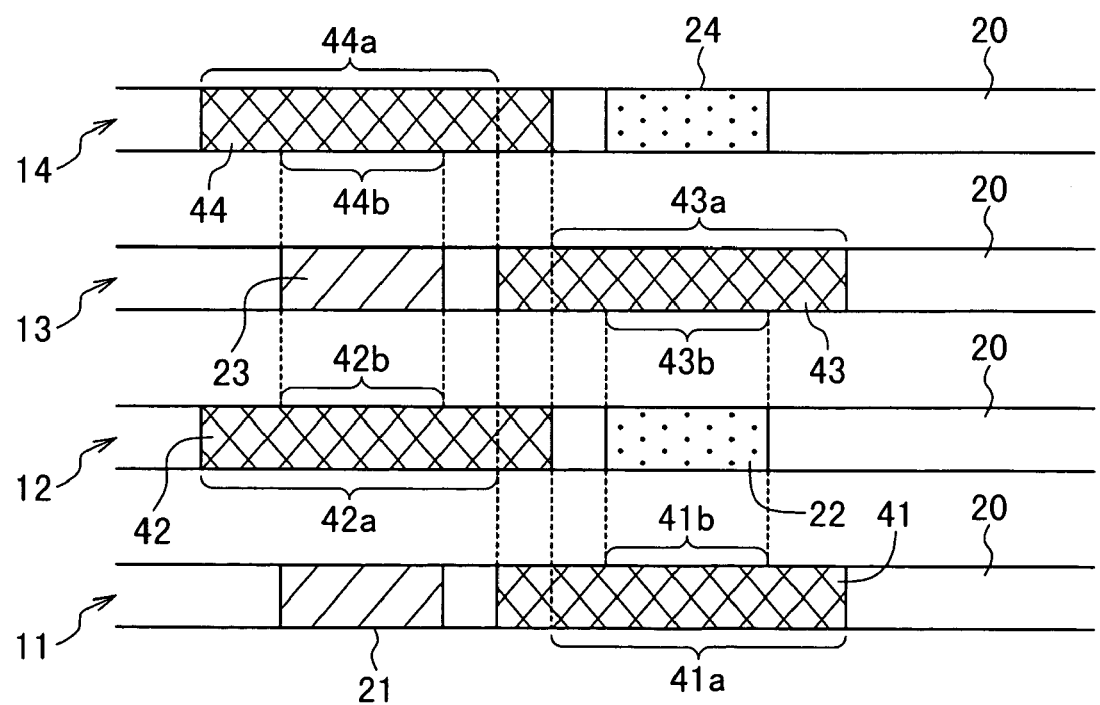
FIG. 10 is a schematic sectional view through line X-X in FIG. 9.

Although in the example described above, the reproduce-only area is identical to the area facing the test recording area, the reproduce-only area may also occupy an additional area not facing the test recording area. An example of such a structure is shown in FIGS. 9 and 10. FIG. 9 is an enlarged plan view of a central region of an optical disc, similar to FIG. 1, and FIG. 10 is a schematic sectional view through line X-X in FIG. 9, similar to FIG. 2.

The optical disc in FIGS. 9 and 10 is similar to the optical disc in FIGS. 1 and 2. However, reproduce-only areas 41 and 43 in the odd-numbered recording layers 11 and 13 are formed in positions mutually aligned in the thickness direction, reproduce-only areas 42 and 44 in the even-numbered recording layers 12 and 14 are formed in positions mutually aligned in the thickness direction, and parts 41a and 43a of the reproduce-only areas 41 and 43 in the odd-numbered recording layers 11 and 13 are formed in positions that do not overlap at least parts 42a and 44a of the reproduce-only areas 42 and 44 in the even-numbered recording layers 12 and 14 in the thickness direction of the optical disc.

The test recording areas 22 and 24 in the even-numbered recording layers 12 and 14 are formed in positions facing parts 41b and 43b of these parts 41a and 43a of the reproduce-only areas 41 and 43 in the odd-numbered recording layers 11 and 13, and the test recording areas 21 and 23 in the odd-numbered recording layers 11 and 13 are formed in positions facing parts 42b and 44b of parts 42a and 44a of the reproduce-only areas 42 and 44 in the even-numbered recording layers 12 and 14.

The test recording areas 22 and 24 in the even-numbered recording layers 12 and 14 may be formed in positions facing all of parts 41a and 43a of the reproduce-only areas 41 and 43 in the odd-numbered recording layers 11 and 13, and the test recording areas 21 and 23 in the odd-numbered recording layers 11 and 13 may be formed in positions facing all of parts 42a and 44a of the reproduce-only areas 42 and 44 in the even-numbered recording layers 12 and 14.

In order to form the optical disc shown in FIGS. 9 and 10, first, an optical disc in which the reproduce-only areas 41 to 44 are formed as shown in FIGS. 9 and 10 is obtained. Next, in the recording layers 11 to 14, the test recording areas 21 to 24 are formed in positions shown in FIGS. 9 and 10 by making a test recording in each recording layer as in the procedure described above.

Figure 11:
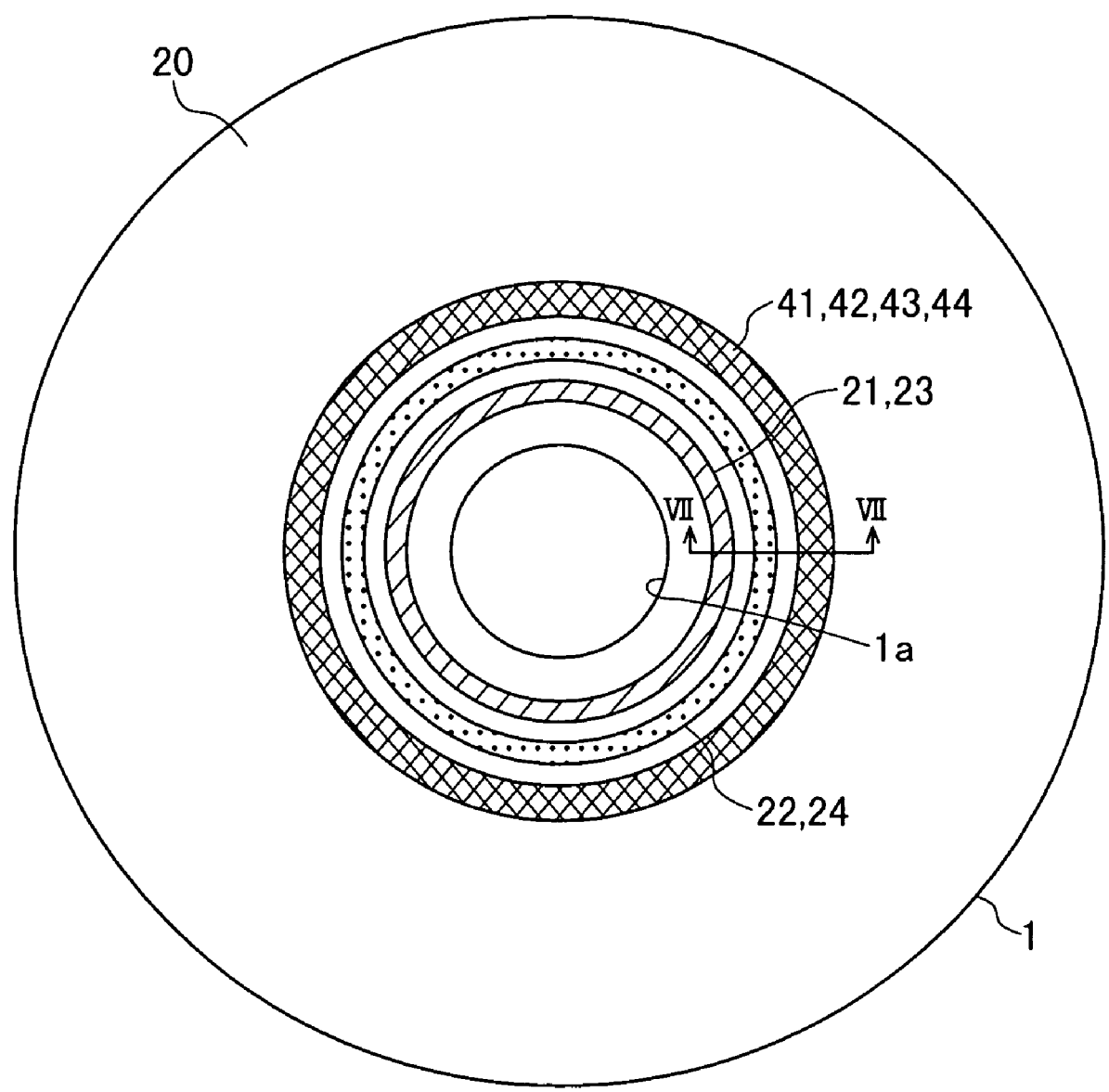
FIG. 11 is a schematic plan view of yet another exemplary optical disc on which recording has been performed by a recording method according to the first embodiment of the invention.
Figure 12:
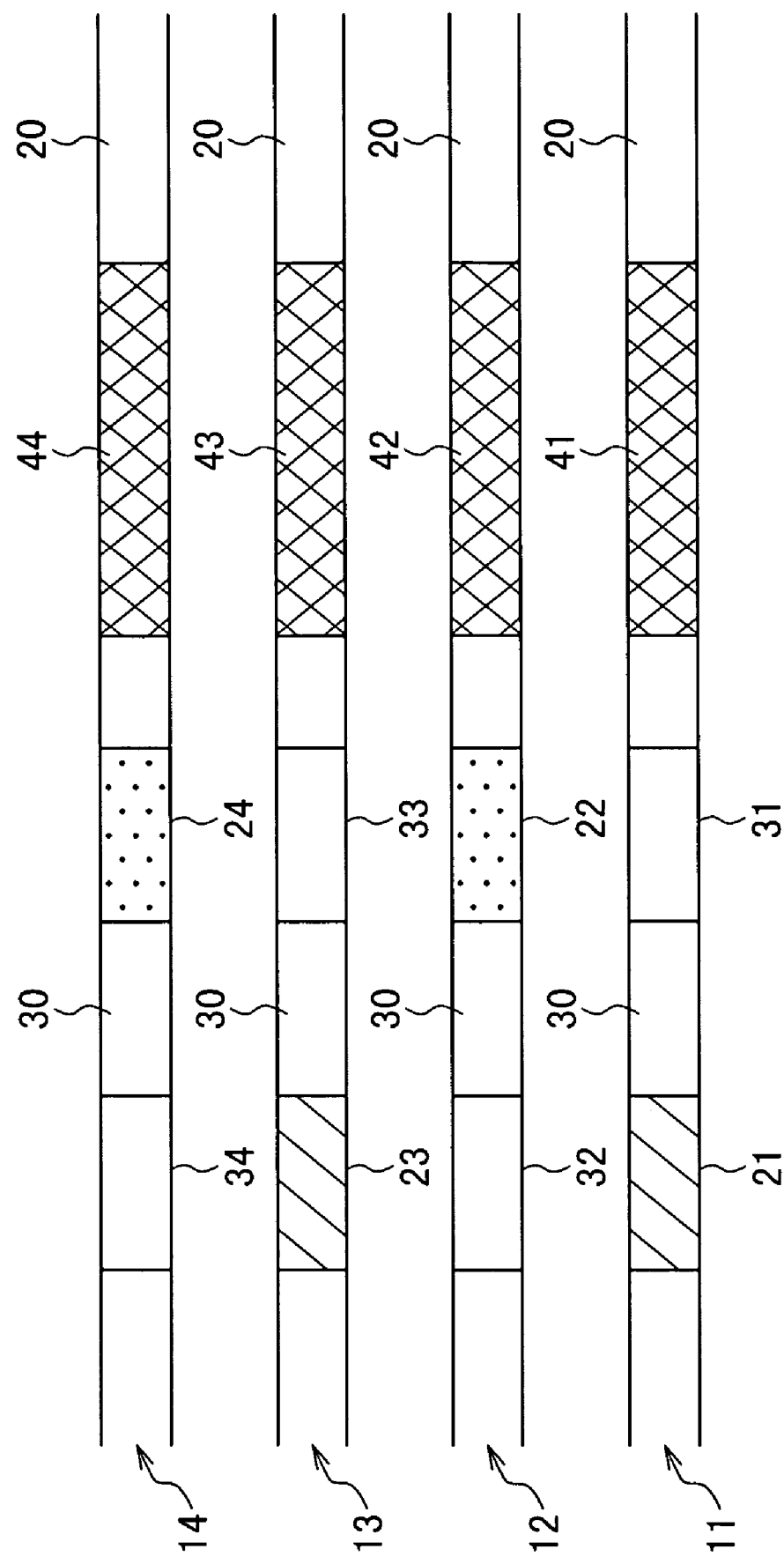
FIG. 12 is a schematic sectional view through line XII-XII in FIG. 11.

In the example shown in FIGS. 1 and 2, the non-recording areas 31 to 34 facing the test recording areas 21 to 24 are reproduce-only areas, but the non-recording areas 31 to 34 need not be reproduce-only areas. If the test recording areas face reproduce-only areas, recording and reproducing in the test recording areas may be affected by pits in the reproduce-only areas; this problem is solved by placing the reproduce-only areas in areas not facing the test recording areas, and using the areas facing the test recording areas as non-recording areas that are not reproduce-only areas. An example of such an alignment of recording areas is shown in FIGS. 11 and 12. FIG. 11 is a plan view, similar to FIG. 1, and FIG. 12 is a schematic sectional view through line XII-XII in FIG. 11, similar to FIG. 2.

The optical disc in FIGS. 11 and 12 is similar to the optical disc in FIGS. 1 and 2. However, the areas 31 to 34 facing the test recording areas 21 to 24 are non-recording areas that are not reproduce-only areas, and reproduce-only areas 41 to 44 are formed in positions outward of and adjacent to the test recording areas 21 to 24 and the facing areas 31 to 34.

In the optical disc in FIGS. 9 and 10, and the optical disc in FIGS. 11 and 12, before a test recording in each recording layer (one of the recording layers 11 to 14), the recording device reads recording conditions from the reproduce-only area (one of the reproduce-only areas 41 to 44) in the same recording layer, then moves the focal point of the optical pickup to the test recording area, and makes the test recording. Recording conditions for the test recording, or at least the initial values used in the test recording, are set according to the recording conditions read from the reproduce-only area.

As described above, if a reproduce-only area which stores recording conditions is placed in a position adjacent to a test recording area, an advantage is that after the processing for reading of the recording conditions is carried out, the distance traveled by the focal point to the area that records test data can be shortened, so the time required for a test recording can also be shortened.

Second Embodiment

Figure 13:
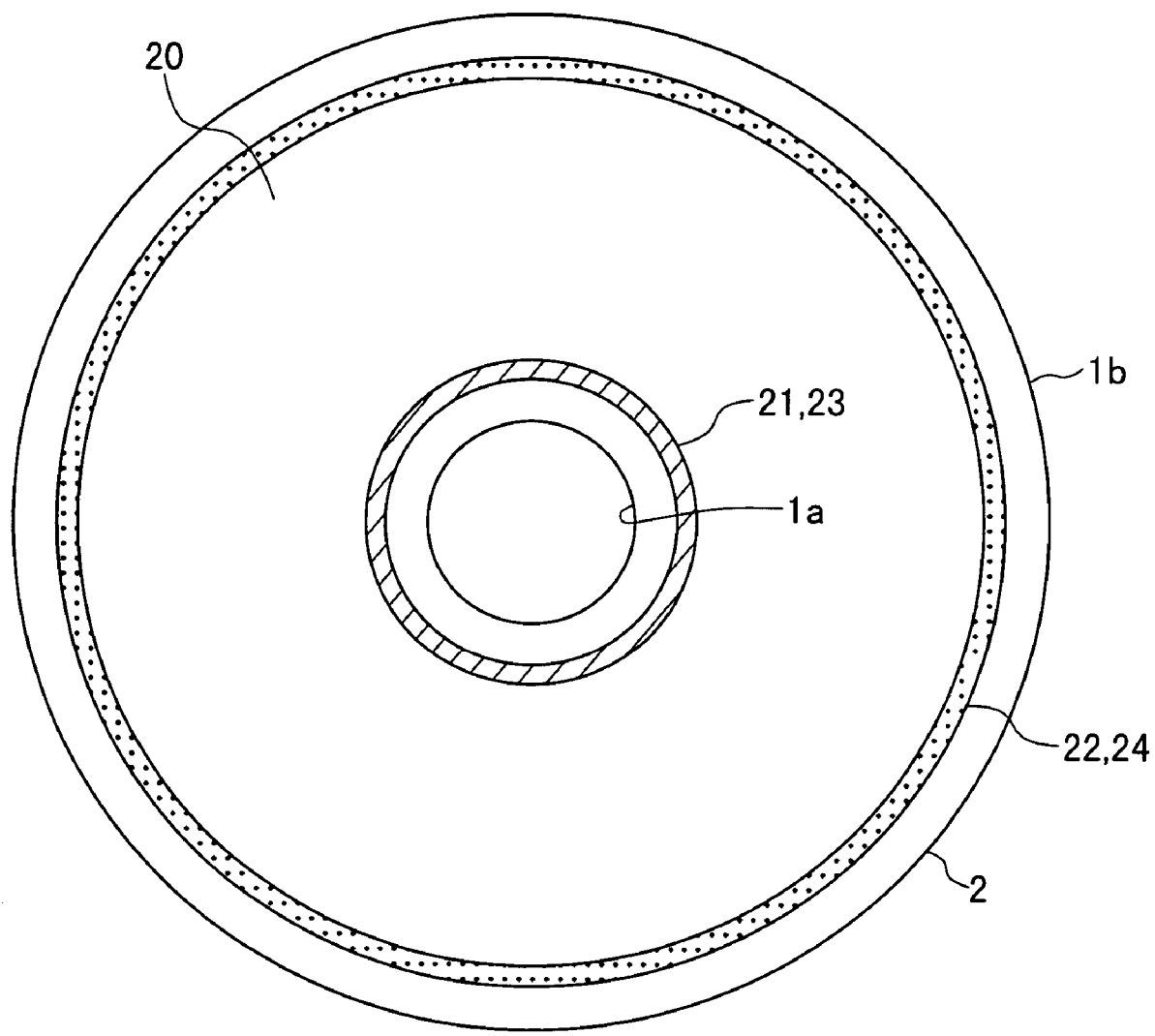
FIG. 13 is a schematic plan view of an exemplary optical disc on which recording has been performed by a recording method according to a second embodiment of the invention.

FIG. 13 is a schematic plan view of an exemplary optical disc on which test data have been recorded by a recording method according to a second embodiment of this invention. In the optical disc 2 shown in FIG. 13, four recording layers are formed: a first recording layer 11, a second recording layer 12, a third recording layer 13, and a fourth recording layer 14, in order of their distance from the surface, similar to the optical disc 1 in FIGS. 1 and 2. In the first, second, third, and fourth recording layers 11, 12, 13, 14, test recording areas 21, 22, 23, 24 for determining the optimal recording power for each recording layer are formed.

In the first embodiment, the test recording areas in the odd-numbered layers and the even-numbered layers are all formed near the inner edge of the optical disc 1, that is, near the innermost circumference 1a, but in the second embodiment, although the test recording areas 21 and 23 in the odd-numbered layers 11 and 13 are located near the inner edge, that is, near the innermost circumference 1a, the test recording areas 22 and 24 in the even-numbered layers 12 and 14 are disposed near the outer edge, that is, near the outermost circumference 1b.

An advantage of this type of arrangement is as follows. Since the test recording area 21 in the first recording layer 11 is formed near the inner edge, for example, a recording in the first recording layer 11 starts near the inner edge; a test recording is made in the test recording area near the inner edge; then user data are recorded sequentially from the inner edge toward the outer edge, and the recording in the first recording layer 11 ends near the outer edge.

When a test recording is made near the inner edge, because the focal point is first moved to the outwardly adjacent reproduce-only area to read the information about recording conditions, the focal point must then move slightly inward, but this is a comparatively small movement (a small amount of travel in the radial direction), so it is true as a whole that the recording proceeds from the inner edge toward the outer edge, even if the focal point moves as described above.

Next, in order to start recording in the second recording layer 12, the focal point has to be moved from the first recording layer 11 to the second recording layer 12. If the test recording area 22 in the second recording layer 12 were to be formed near the inner edge, the focal point would have to be moved from the outer edge to the inner edge, requiring extra access time. If the test recording area 22 is formed near the outer edge as in the second embodiment, such travel of the focal point in the second recording layer 12 (until it reaches the test recording area 22) is unnecessary; when the recording in the first recording layer 11 ends, the focal point is near the outer edge, so it only has to be moved from the first recording layer 11 to the second recording layer; a test recording is made in the test recording area 22 near the outer edge; then user data are recorded, proceeding from the outer edge toward the inner edge. The time for a test recording can accordingly be shortened.

Similarly, when all recording (test recording and the recording of user data) in the second recording layer 12 is completed, the focal point is near the inner edge of the optical disc, and when the focal point is moved from the second recording layer 12 to the third recording layer 13 to start recording in the third recording layer 13, since the test recording area 23 is formed near the inner edge, no movement of the focal point in the third recording layer 13 is necessary, so the time for the test recording can be shortened.

Similarly, when all recording (test recording and the recording of user data) in the third recording layer 13 is completed, the focal point is near the outer edge of the optical disc, and when the focal point is moved from the third recording layer 13 to the fourth recording layer 14 to start recording in the fourth recording layer 14, since the test recording area 24 is formed near the outer edge, no movement of the focal point in the fourth recording layer 14 is necessary, so the time for the test recording can also be shortened.

The time for test recording can thus be shortened because the test recording areas 21 and 23 in the odd-numbered first and third recording layers 11 and 13 are formed near the inner edge and the test recording areas 22 and 24 in the even-numbered second and fourth recording layers are formed near the outer edge, as described above.

Instead of this arrangement, the test recording areas 21 and 23 in the odd-numbered first and third recording layers 11 and 13 may be formed near the outer edge and the test recording areas 22 and 24 in the even-numbered second and fourth recording layers may be formed near the inner edge; a similar effect is also obtained in this case.

The procedures for making test recordings by using each recording area and determining the optimal recording power for each recording layer are the same as in the first embodiment.

Third Embodiment

Figure 14:
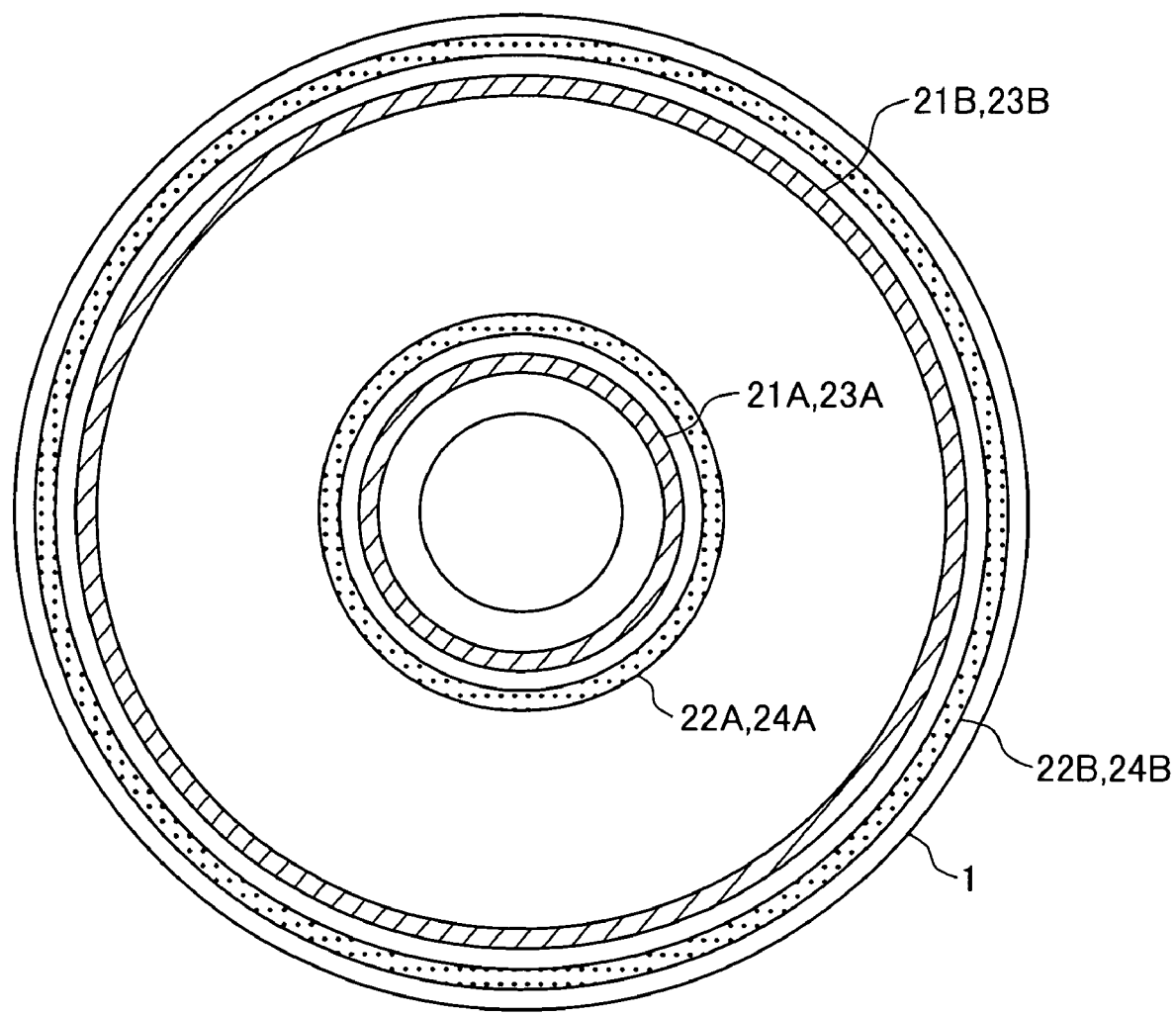
FIG. 14 is a schematic plan view of an exemplary optical disc on which recording has been performed by a recording method according to a third embodiment of the invention.

FIG. 14 is a schematic plan view of an exemplary optical disc on which test data have been recorded by a recording method according to a third embodiment of this invention. In the optical disc 2 shown in FIG. 14, four recording layers are formed: a first recording layer 11, a second recording layer 12, a third recording layer 13, and a fourth recording layer 14, in order of their distance from the surface, similar to the optical disc 1 in FIGS. 1 and 2 and the optical disc in FIG. 13. The optical disc 2 in FIG. 14 differs from the optical disc 1 in FIGS. 1 and 2 and the optical disc 2 in FIG. 13 by having test recording areas near both the inner edge, that is, the innermost circumference 1a, and the outer edge, that is, the outermost circumference 1b, in each recording layer. More specifically, the first recording layer 11 has a test recording area 21A near the inner edge, and a test recording area 21B near the outer edge. Similarly, the second, third, and fourth recording layers 12, 13, 14 have test recording areas 22A, 23A, 24A near the inner edge, and test recording areas 22B, 23B, 24B near the outer edge, respectively.

An advantage of forming test recording areas in each layer near both the inner edge and the outer edge as described above is as follows. When recording on the optical disc is performed at high speed, in order to obtain the same linear velocity, the optical disc has to be rotated near the inner edge almost twice as fast as near the outer edge, but this often exceeds the limit within which the disc motor can be used. When recording on the optical disc is performed at high speed, because conditions near the inner edge differ considerably from conditions near the outer edge, the optimal recording power obtained by making test recordings in a test recording area near the inner edge may be inappropriate for use in recording user data near the outer edge. The optimal recording power obtained by making test recordings in a test recording area near the outer edge may also be inappropriate for use in recording user data near the inner edge. This problem is solved by forming test recording areas near both the inner edge and the outer edge, as shown in FIG. 14, and determining the optimal recording power by using both the optimal recording power obtained by making test recordings in the test recording area near the inner edge and the optimal recording power obtained by making test recordings in the test recording area near the outer edge, together with the radial position at which the user data are recorded. For example, the optimal recording power obtained by making test recordings in the test recording area near the inner edge may be used for recording user data near the inner edge, specifically, inward of a predetermined position in the radial direction, e.g., the midpoint position, and the optimal recording power obtained by making test recordings in the test recording area near the outer edge may be used for recording user data near the outer edge, specifically, outward of a predetermined position in the radial direction, e.g., the midpoint position. Alternatively, user data may be recorded by using a recording power obtained by taking a weighted average of the optimal recording power obtained by making test recordings in the test recording area near the inner edge and the optimal recording power obtained by making test recordings in the test recording area near the outer edge, weighted according to the recording position of the user data (the radial position).

Fourth Embodiment

Although a procedure for test recording has been described in relation to the first embodiment above, test recordings can be made by a differing procedure described below, instead of the procedure in the first embodiment.

More specifically, in the first embodiment, test recordings in each recording layer are made in a sequence of operations in which, in the recording of the test data, the recording power level is changed (step S13 in FIG. 5) in steps of a width set at a value necessary for determining the optimal recording power with sufficient accuracy, but the procedure described above may be performed in plurality of stages.

A procedure performed in two stages will be described below. The first stage is, as it were, a coarse adjustment: test data are recorded at a plurality of recording power values differing by a first predetermined step width in a test recording area, the recorded test data are reproduced, and an approximate value of the optimal recording power is determined by evaluating the reproduction results. The second stage is, as it were, a fine adjustment: test data are recorded at a plurality of recording power values in a range near the approximate value of the optimal recording power, differing by a second predetermined step width smaller than the first predetermined step width in the test recording area, the recorded test data are reproduced, and a more precise value of the optimal recording power is determined by evaluating the reproduction results.

In the coarse adjustment, for example, the recording power level is changed in steps of a comparatively large width throughout a range (a maximum range) considered to include all possible values of the optimal recording power level despite variations in the optical disk manufacturing process and recording conditions (such as temperature), and a range around the approximate value of the optimal recording power, i.e., a range determined to include the optimal recording power, is obtained under the current recording conditions for each recording layer in the currently used optical disc. In the fine adjustment, the recording power level is changed in steps of a comparatively small width in the range determined to include the optimal recording power, and the optimal recording power is obtained.

Figure 15:
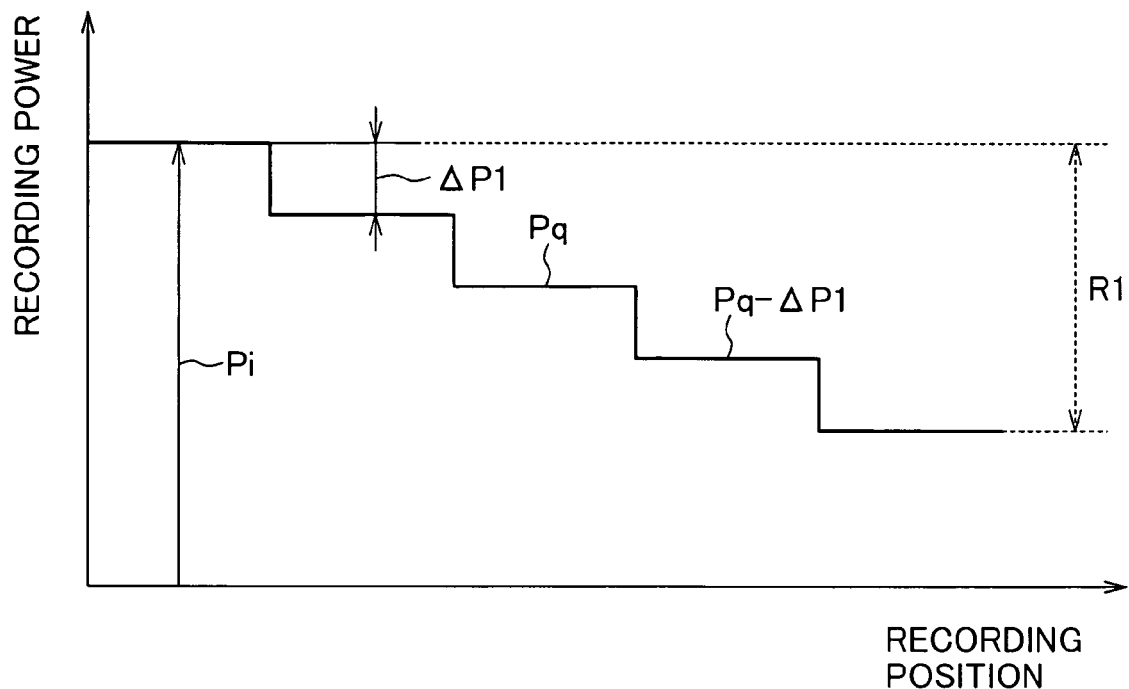
FIG. 15 shows an example of a relationship between recording position and recording power in a test recording area in a coarse adjustment in a recording method according to a fourth embodiment of the invention.
Figure 16:
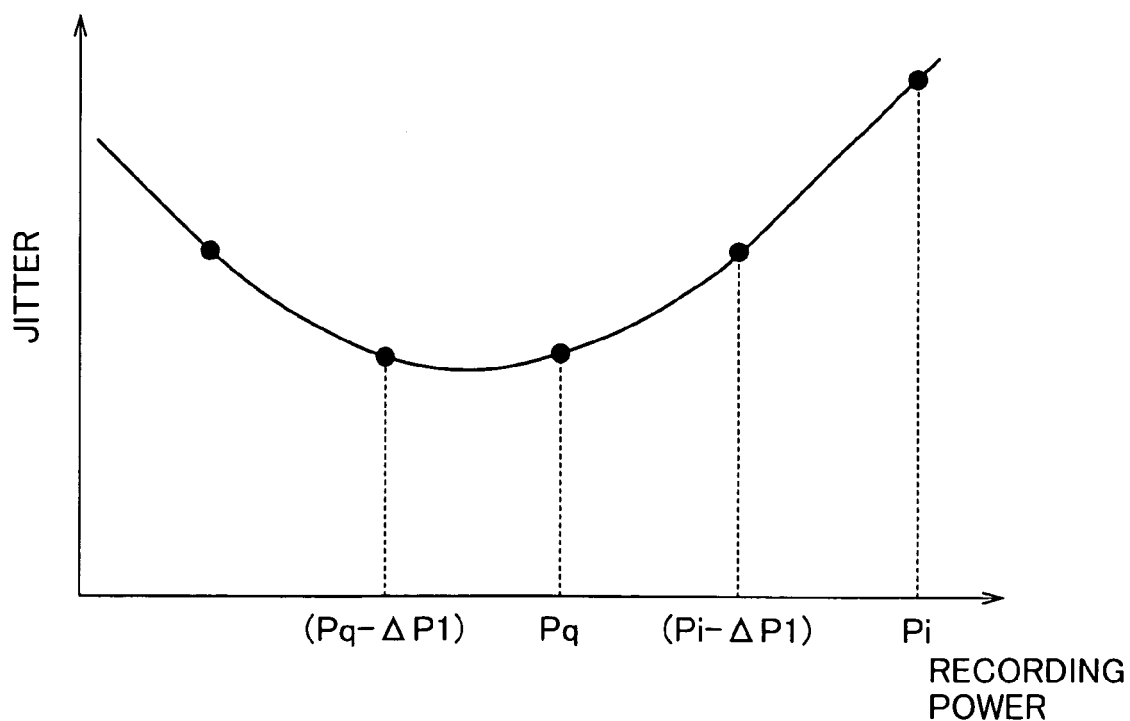
FIG. 16 shows an example of a relationship between test recording position and jitter in the coarse adjustment in the recording method according to a fourth embodiment of the invention.
Figure 17:
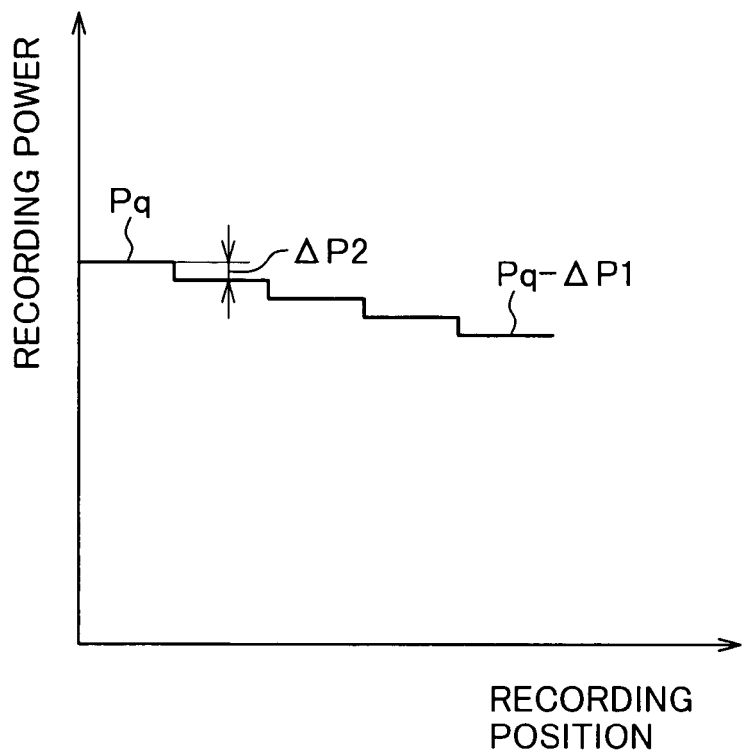
FIG. 17 shows an example of a relationship between recording position and recording power in a test recording area in a fine adjustment in the recording method according to a fourth embodiment of the invention.
Figure 18:
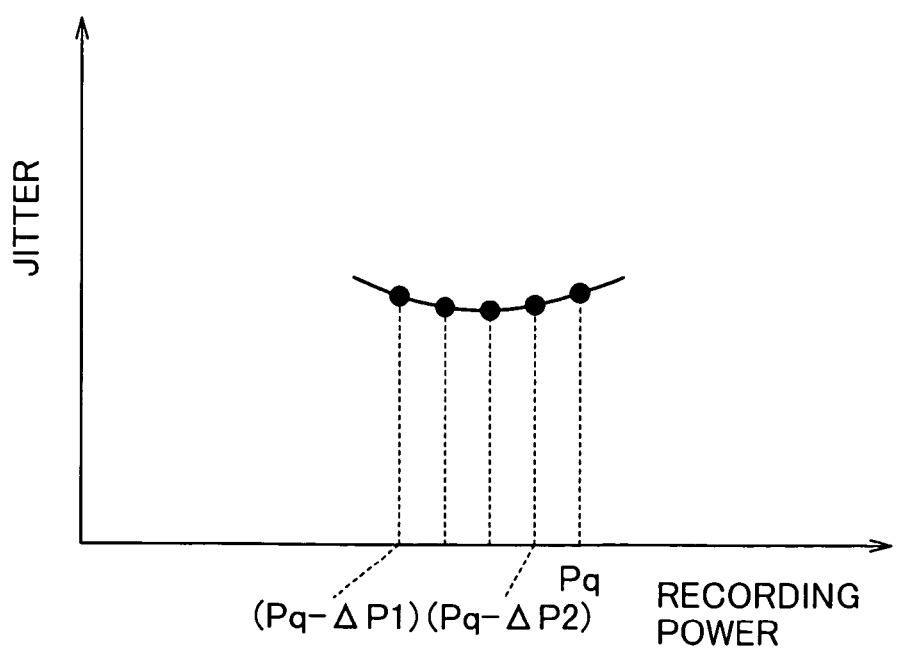
FIG. 18 shows an example of a relationship between test recording position and jitter in the fine adjustment in the recording method according to a fourth embodiment of the invention.

In the coarse adjustment, for example, in the maximum range R1, the recording power level is changed in steps of a comparatively large width $\Delta P1$, and the optimal value Po is found to be included in the range from a recording power Pq to a recording power (Pq−$\Delta P1$), as shown in FIGS. 15 and 16. In the fine adjustment, as shown in FIGS. 17 and 18, the recording power level is changed in steps of a width $\Delta P2$ smaller than step width $\Delta P1$ in the range from recording power Pq to recording power (Pq−$\Delta P1$), and the optimal value Po is determined.

Figure 19:
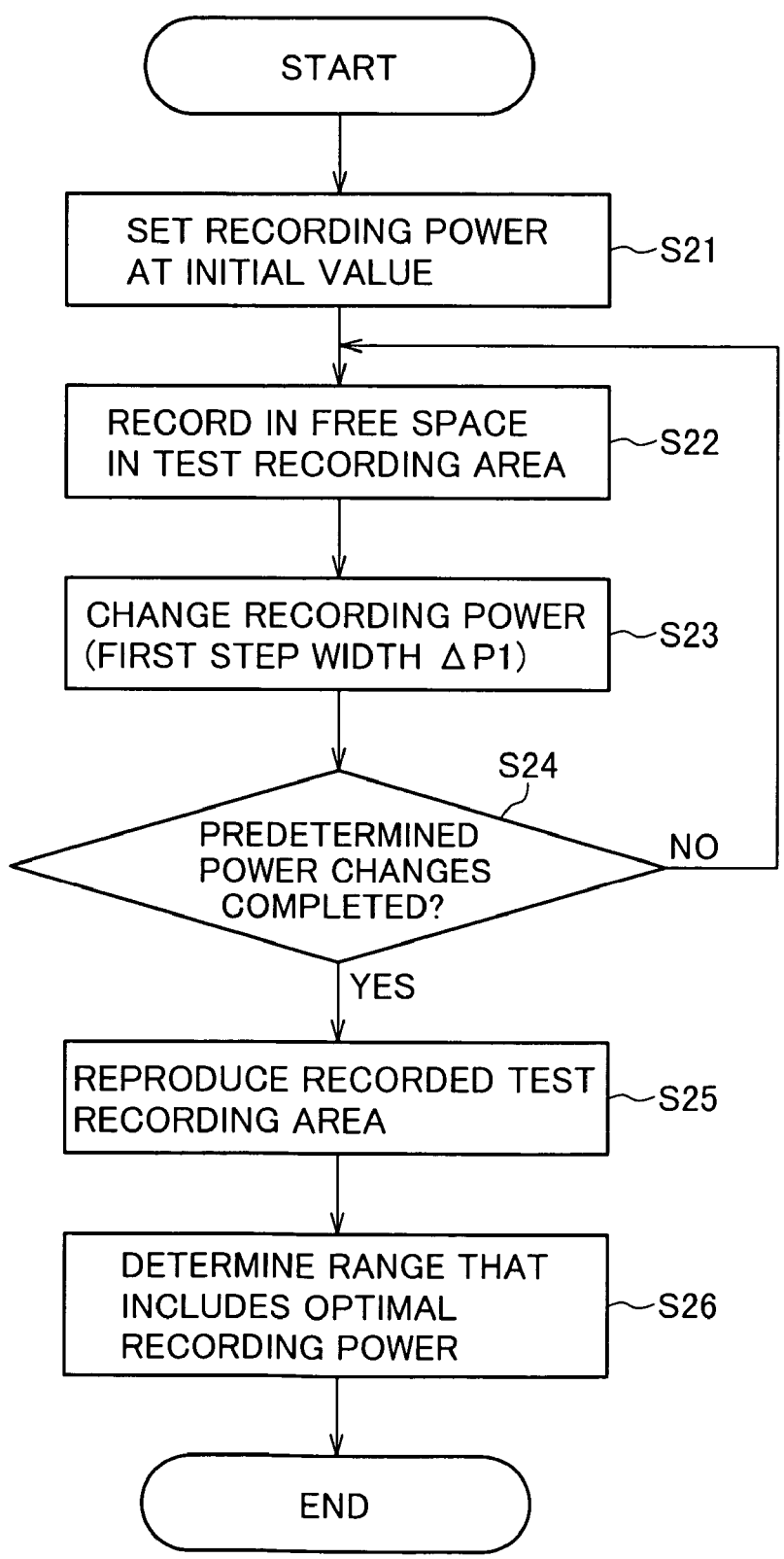
FIG. 19 is a flowchart showing a recording procedure in the coarse adjustment in the fourth embodiment of the invention.
Figure 20:
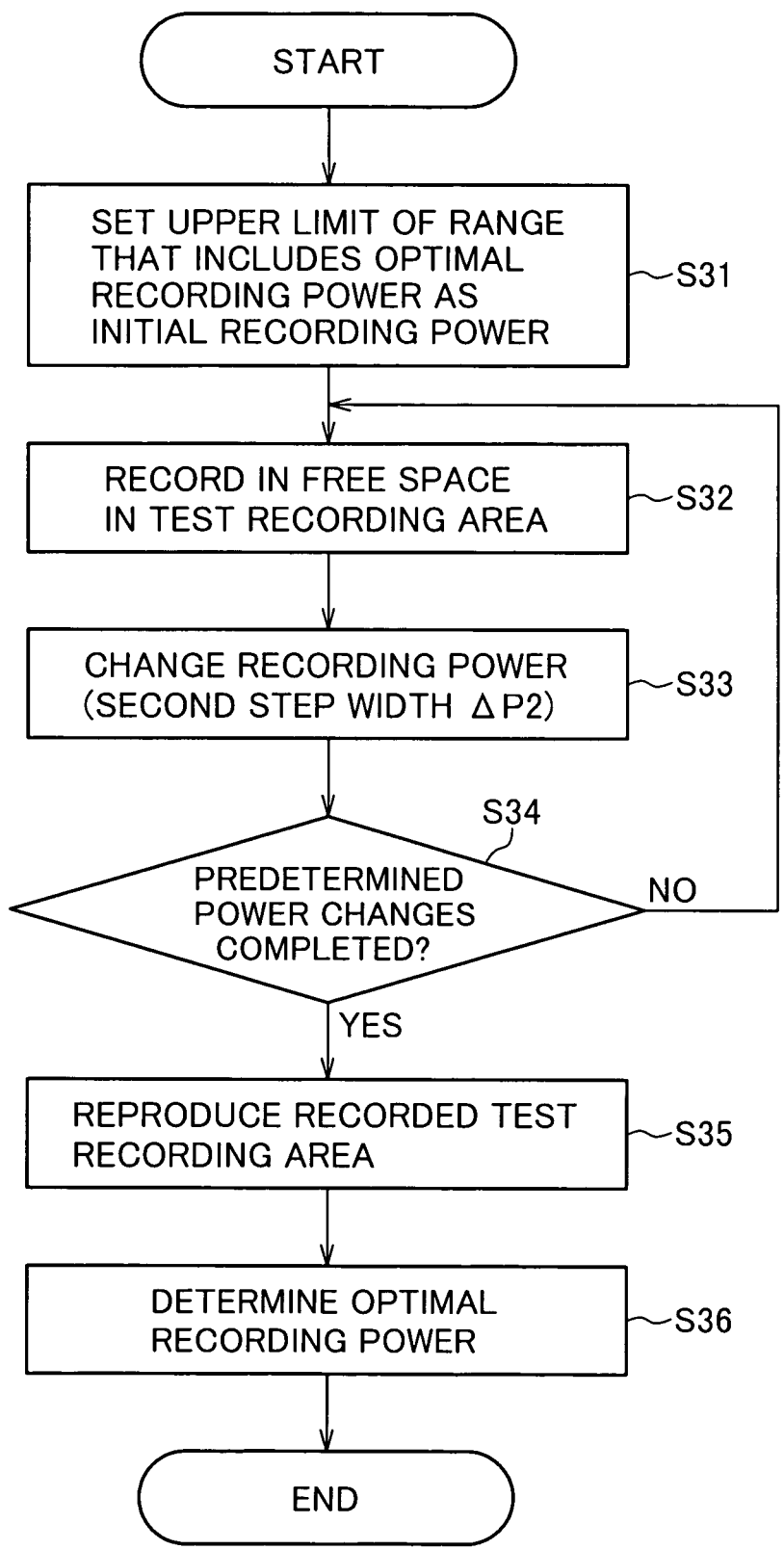
FIG. 20 is a flowchart showing a recording procedure in the fine adjustment in the fourth embodiment of the invention.

FIGS. 19 and 20 are flowcharts showing the processes described above. Of these processes, the process of the coarse adjustment shown in FIG. 19 is broadly the same as the process in FIG. 5, steps S21 to S27 corresponding to steps S11 to S17, respectively, but the step width by which the recording power is changed in step S23 is larger than the step width in step S13. In step S26, the optimal recording power is not determined as in step S16; instead, a process for determining a range that includes the optimal recording power is performed.

The fine adjustment process shown in FIG. 20 is broadly the same as the process in FIG. 5, steps S31 to S37 corresponding to steps S11 to S17, respectively, but the initial value of the initialized recording power level in step S31 is set at the upper limit of the range determined in step S26. In step S34, in which whether the predetermined changes of the recording power level have been completed is decided, whether the recording power level has reached the lower limit in the range determined in step S26 is determined.

When the procedure is performed in two stages as described above, the fine adjustment may be performed at once after the coarse adjustment ends, or after the coarse adjustment and another procedure end.

For example, when an optical disc has a plurality of recording layers, e.g., two recording layers, and user data are recorded first in one of the recording layers (the first recording layer), then in the other recording layer (the second recording layer), before the recording of user data starts in the first recording layer, a test recording may be made in the first recording layer and the first-stage test recording (the coarse adjustment) described above may be made in the second recording layer; then, after the recording of user data ends in the first recording layer and before the recording of user data starts in the second recording layer, the second-stage procedure (the fine adjustment) described above may be performed.

When a continuous recording is made across the first and second recording layers, the interval from when the recording of user data ends in the first recording layer to when the recording of user data starts in the second recording layer is preferably short. On the other hand, since recording conditions (such as temperature) change from time to time, most preferably, the fine adjustment is performed in a given recording layer just before the start of the recording of user data in that recording layer. The procedure described above satisfies these two requirements.

In the procedure described above, the first-stage process (the coarse adjustment) may be performed in the second recording layer either before or after the test recording in the first recording layer. The test recording in the first recording layer may be made in two stages, or in one stage as described with reference to FIG. 5.

Moreover, when the recording of user data in the first recording layer is suspended for a time of sufficient length to perform the first-stage test recording (the coarse adjustment) in the second recording layer, the coarse adjustment may be performed in the second recording layer during the suspension. The essential point is that if the coarse adjustment is performed in the second recording layer before the recording of user data ends in the first recording layer, then the time from the end of the recording of user data in the first recording layer to the start of recording of user data in the second recording layer can be shortened because only the fine adjustment is required in the second recording layer.

Fifth Embodiment

Although the recording of user data in each recording layer is preceded by a test recording in the first embodiment, in an alternative process, test recordings (steps S1 to S3) may be made in several or all of the recording layers in an optical disc before the recording of user data starts in any of those recording layers.

In this case, after test data are recorded (steps S11 to S14 in FIG. 5) in one recording layer and reproduced (step S15), and the optimal recording power is determined (step S16), test data may be recorded (steps S11 to S14) in another recording layer, or after test data are recorded in a plurality of recording layers (steps S11 to S14), the test data may be reproduced in succession in the plurality of recording layers (step S15), and the optimal recording powers may be determined (step S16) in the plurality of recording layers.

If the recording of user data starts after test recordings have been made in a plurality of recording layers as described above, when a continuous recording spans one recording layer (the first recording layer) and another recording layer (the second recording layer), an advantage is that the recording of user data starts in the second recording layer immediately after the recording of user data ends in the first recording layer (because no test recording is necessary).

Whether to make a test recording before user data are recorded in each recording layer or to make a plurality of test recordings before user data are recorded in a plurality of recording layers as described above can also be selected. For example, a recording device may include a control input means for making a selection, so that a user can make a selection by operating the control input means. When the user makes a recording that is expected to extend over a plurality of recording layers, for example, the user may, by operating the control input means, have test recordings made in that plurality of recording layers.

When test recordings are made before user data are recorded in a plurality of recording layers as described above, if the test recording areas in all recording layers are formed near the inner edge of the optical disc as shown in FIGS. 1 and 2, or alternatively, if the test recording areas in all recording layers are formed near the outer edge of the optical disc, then the focal point remains located near the inner edge or the outer edge and only has to be moved between recording layers, with the effect of shortening the test recording time.

Sixth Embodiment

Although the first to fifth embodiments have been described as making a test recording before user data are recorded in each recording layer and recording user data in the recording layer at the optimal recording power thereby determined, this does not necessarily mean that the same recording power has to be used across all of the recording layer; during the recording of user data in each recording layer, temperature variations etc. may be detected and the power may be adjusted accordingly.

When the recording of user data is suspended during the recording of user data in a recording layer, a test recording may be made, for example, and a newly determined optimal recording power may be used for recording subsequent user data.

The condition for making a new test recording in each recording layer as described above may be a temperature change greater than or equal to a predetermined value, or a lapse of at least a predetermined time from the previous test recording.

Seventh Embodiment

Even when the recording of user data (step S4) starts after test recordings (steps S1 to S3) have been made in several or all of the recording layers in the optical disc as described in the fifth embodiment, for example, if the recording of user data is suspended during the recording of user data in one recording layer, a test recording may be made, and a newly determined optimal recording power may used for the subsequent recording of user data in that one recording layer; in this case, when the recording of user data ends in the one recording layer and begins in a new recording layer, the recording of user data in the new recording layer may start at a recording power level determined from the recording power level that was used at the conclusion of the recording of user data in the previous recording layer and the ratio between the respective optimal recording power levels obtained for the two recording layers when test recordings were first made in the plurality of recording layers.

For example, suppose that test recordings are made before the recording of user data starts in first and second recording layers, the optimal recording power levels in the first and second recording layers are determined as $Po1a$ and $Po2a$. The recording of user data then starts in the first recording layer with use of recording power $Po1a$, but the recording is discontinued and a new test recording is made, yielding a new optimal recording power $Po1b$. The subsequent recording in the first recording layer is made with use of this optimal recording power $Po1b$, so the optimal recording power in use at the conclusion of the recording of user data in the first recording layer is $Po1b$. The ratio between the respective optimal recording power levels obtained for the two recording layers when test recordings were first made in the plurality of the recording layers is $Po2a/Po1a$. The optimal recording power $Po1b$ and the ratio $Po2a/Po1a$ are used to calculate a power level $Po2b$ as follows $$Po2b=Po1b\times(Po2a/Po1a)$$

and $Po2b$ is used as the optimal recording power when the recording of user data starts in the second recording layer.

Consequently, when a continuous recording is made across the first and second recording layers, an advantage is that the recording of user data starts in the second recording layer immediately after the recording of user data ends in the first recording layer (because no test recording is necessary).

Moreover, if the suspension of the recording of user data in one recording layer is comparatively long and provides sufficient time to make test recordings in the one recording layer and the next recording layer that will be used for recording, test recordings may be made again in both the one recording layer and the next recording layer, while if the suspension time during the recording of user data in the one recording layer is comparatively short and does not provide sufficient length to make test recordings in both recording layers, but does provide sufficient length to make a test recording in the one recording layer, a test recording may be made again in only the one recording layer. The recording of user data may then start in the next recording layer at a power level determined by use of the recording power that was used at the conclusion of the recording of user data in the one recording layer and the ratio between the optimal recording power levels obtained for the two recording layers when the last simultaneous test recordings were made in the two recording layers.

In this case also, whether to make the recording as described above may be selected by the user by operating a control input means.

What is claimed is:

1. A recording method for an optical disc having at least three recording layers, the method including
    a step of recording and reproducing test data for determining the optimal recording power when user data are recorded in each recording layer, and determining the optimal recording power by evaluating the reproduction results, wherein
    when test recording areas are formed by recording the test data, the test recording areas in the odd-numbered recording layers and the test recording areas in the even-numbered recording layers do not overlap in the thickness direction of the optical disc, the test recording areas in the odd-numbered recording layers are mutually aligned in the thickness direction, and the test recording layers in the even-numbered recording layers are mutually aligned in the thickness direction,
    wherein the test recording areas in the odd-numbered recording layers are formed adjacent one of the innermost circumference and the outermost circumference of the optical disc, and the test recording areas in the even-numbered recording layers are formed adjacent another one of the innermost circumference and the outermost circumference of the optical disc.

2. The recording method for an optical disc of claim 1, wherein the test recording areas are formed in positions facing a reproduce-only area of the optical disc.

3. A recording method for an optical disc having at least three recording layers, the method including
    a step of recording and reproducing test data for determining the optimal recording power when user data are recorded in each recording layer, and determining the optimal recording power by evaluating the reproduction results, wherein
    when test recording areas are formed by recording the test data, the test recording areas in the odd-numbered recording layers and the test recording areas in which the test data are recorded in the even-numbered recording layers do not overlap in the thickness direction of the optical disc, the test recording areas in the odd-numbered recording layers are mutually aligned in the thickness direction, and the test recording layers in the even-numbered recording layers are mutually aligned in the thickness direction, wherein the test recording areas in the odd-numbered recording layers and the test recording areas in the even-numbered recording layers are both formed adjacent an outermost circumference of the optical disc.

4. An optical disc having at least three recording layers, in each of which a test recording area is formed by recording test data for determining the optimal recording power when user data are recorded, wherein the test recording areas in the odd-numbered recording layers and the test recording areas in the even-numbered recording layers do not overlap in the thickness direction of the optical disc, the test recording areas in the odd-numbered recording layers are mutually aligned in the thickness direction, and the test recording areas in the even-numbered recording layers are mutually aligned in the thickness direction, wherein the test recording areas in the odd-numbered recording layers are formed adjacent one of the innermost circumference and the outermost circumference of the optical disc, and the test recording areas in the even-numbered recording layers are formed adjacent another one of the innermost circumference and the outermost circumference of the optical disc.

5. The optical disc of claim 4, wherein the test recording areas are formed in positions facing a reproduce-only area of the optical disc.

6. An optical disc having at least three recording layers, in each of which a test recording area is formed by recording test data for determining the optimal recording power when user data are recorded, wherein the test recording areas in the odd-numbered recording layers and the test recording areas in which the test data are recorded in the even-numbered recording layers do not overlap in the thickness direction of the optical disc, the test recording areas in the odd-numbered recording layers are mutually aligned in the thickness direction, and the test recording layers areas in the even-numbered recording layers are mutually aligned in the thickness, wherein the test recording areas in the odd-numbered recording layers and the test recording areas in the even-numbered recording layers are both formed adjacent an outermost circumference of the optical disc.

* * * * *